United States Patent
Danilov et al.

(10) Patent No.: US 11,681,460 B2
(45) Date of Patent: Jun. 20, 2023

(54) SCALING OF AN ORDERED EVENT STREAM BASED ON A WRITER GROUP CHARACTERISTIC

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 69 days.

(21) Appl. No.: 17/337,940

(22) Filed: Jun. 3, 2021

(65) Prior Publication Data
US 2022/0391126 A1    Dec. 8, 2022

(51) Int. Cl.
| | |
|---|---|
| G06F 3/06 | (2006.01) |
| G06F 9/54 | (2006.01) |
| G06F 9/50 | (2006.01) |

(52) U.S. Cl.
CPC .......... *G06F 3/0655* (2013.01); *G06F 3/0604* (2013.01); *G06F 3/0679* (2013.01); *G06F 9/505* (2013.01); *G06F 9/5016* (2013.01); *G06F 9/5061* (2013.01); *G06F 9/544* (2013.01)

(58) Field of Classification Search
None
See application file for complete search history.

(56) References Cited

U.S. PATENT DOCUMENTS

| | | |
|---|---|---|
| 3,617,587 A | 11/1971 | Nayar et al. |
| 5,826,977 A | 10/1998 | Fowler et al. |
| 7,340,690 B2 | 3/2008 | Lau |
| 7,430,570 B1 | 9/2008 | Srinivasan et al. |

(Continued)

FOREIGN PATENT DOCUMENTS

| | | |
|---|---|---|
| CA | 2 534 170 A1 | 7/2007 |
| CA | 2672879 | 4/2008 |

(Continued)

OTHER PUBLICATIONS

Office Action dated Jul. 8, 2022 for U.S. Appl. No. 16/864,892, 33 pages.

(Continued)

*Primary Examiner* — Craig C Dorais
(74) *Attorney, Agent, or Firm* — Amin, Turocy & Watson, LLP

(57) ABSTRACT

Scaling of an ordered event stream (OES) based on a characteristic of one or more writer groups is disclosed. Scaling a portion of an OES contemporaneous to writing events into that portion can conserve computing resources in contrast to more conventional scaling techniques. Moreover, scaling an OES contemporaneously with writing events thereto can enable improved management of OES scaling for applications that can both read events from an input portion of an OES and, via interim events and interim portions of an OES, write events to an output portion of an OES. An application instance can therefore simultaneously act as both a reader group and writer group and can manage data via interim OESs, such that effects of passing the data through the interim OESs can be cascaded into a scaling of the output portion of an OES based on the writer group characteristic.

20 Claims, 10 Drawing Sheets

(56) References Cited

U.S. PATENT DOCUMENTS

| | | |
|---|---|---|
| 7,610,437 B2 | 10/2009 | Sinclair et al. |
| 7,769,717 B2 | 8/2010 | Federwisch et al. |
| 7,984,084 B2 | 7/2011 | Sinclair |
| 8,285,918 B2 | 10/2012 | Maheshwari |
| 8,443,263 B2 | 5/2013 | Selinger et al. |
| 8,572,091 B1 | 10/2013 | Sivasubramanian et al. |
| 8,655,825 B2 | 2/2014 | Roesch et al. |
| 8,732,403 B1 | 5/2014 | Nayak |
| 8,825,848 B1 | 9/2014 | Dotan et al. |
| 8,873,284 B2 | 10/2014 | Sinclair et al. |
| 8,984,248 B2 | 3/2015 | Morishita et al. |
| 9,223,693 B2 | 12/2015 | Sinclair et al. |
| 9,336,133 B2 | 5/2016 | Sinclair et al. |
| 9,348,746 B2 | 5/2016 | Sinclair et al. |
| 9,407,521 B1 | 8/2016 | Kulkarni |
| 9,465,731 B2 | 10/2016 | Sinclair et al. |
| 9,514,018 B2 | 12/2016 | Sikri |
| 9,591,316 B2 | 3/2017 | Bracha et al. |
| 9,639,589 B1 | 5/2017 | Theimer |
| 9,715,434 B1 | 7/2017 | Xu et al. |
| 9,734,050 B2 | 8/2017 | Sinclair et al. |
| 9,734,911 B2 | 8/2017 | Sinclair et al. |
| 9,753,932 B1 | 9/2017 | Brow et al. |
| 9,778,855 B2 | 10/2017 | Sinclair |
| 9,892,803 B2 | 2/2018 | Reed |
| 9,898,482 B1 | 2/2018 | Bono |
| 9,965,215 B1 | 5/2018 | Vazhenin et al. |
| 10,108,543 B1 | 10/2018 | Duggal et al. |
| 10,108,544 B1 | 10/2018 | Duggal et al. |
| 10,120,613 B2 | 11/2018 | Sinclair et al. |
| 10,133,490 B2 | 11/2018 | Sinclair et al. |
| 10,255,179 B2 | 4/2019 | Ji et al. |
| 10,338,834 B1 | 7/2019 | Dighe et al. |
| 10,430,279 B1 | 10/2019 | Dittia et al. |
| 10,565,208 B2 | 2/2020 | Triou, Jr. et al. |
| 10,628,424 B2 | 4/2020 | Park et al. |
| 10,705,741 B1 | 7/2020 | Varadarajan et al. |
| 10,795,812 B1 | 10/2020 | Duggal et al. |
| 10,860,457 B1 | 12/2020 | Evenson |
| 10,867,033 B2 | 12/2020 | Keren et al. |
| 10,891,228 B2 | 1/2021 | Burow |
| 10,983,715 B2 | 4/2021 | Sharoni et al. |
| 11,016,826 B2 | 5/2021 | Lehmann |
| 11,086,537 B2 | 8/2021 | Byun |
| 11,194,638 B1 | 12/2021 | Danilov et al. |
| 11,314,779 B1 | 4/2022 | Jain |
| 11,354,054 B2 | 6/2022 | Danilov et al. |
| 2004/0199524 A1 | 10/2004 | Rys et al. |
| 2005/0025152 A1 | 2/2005 | Georgiou et al. |
| 2005/0055519 A1 | 3/2005 | Stuart et al. |
| 2006/0036568 A1 | 2/2006 | Moore et al. |
| 2006/0058987 A1* | 3/2006 | Kumar .................. G06Q 30/06 703/2 |
| 2007/0033325 A1 | 2/2007 | Sinclair et al. |
| 2007/0047635 A1 | 3/2007 | Stojanovic et al. |
| 2007/0220518 A1 | 9/2007 | Verbowski et al. |
| 2008/0059724 A1 | 3/2008 | Stifter, Jr. |
| 2008/0082596 A1 | 4/2008 | Gorobets |
| 2008/0144079 A1 | 6/2008 | Pandey et al. |
| 2008/0184262 A1 | 7/2008 | Ginis et al. |
| 2008/0189477 A1 | 8/2008 | Asano et al. |
| 2008/0288713 A1 | 11/2008 | Lee et al. |
| 2008/0301135 A1 | 12/2008 | Alves et al. |
| 2009/0182784 A1 | 7/2009 | Rohit et al. |
| 2010/0083098 A1 | 4/2010 | Leme et al. |
| 2010/0088296 A1 | 4/2010 | Periyagaram et al. |
| 2010/0077013 A1 | 5/2010 | Clements et al. |
| 2010/0125553 A1 | 5/2010 | Huang et al. |
| 2010/0125794 A1 | 5/2010 | Hampton et al. |
| 2010/0174881 A1 | 7/2010 | Anglin et al. |
| 2010/0205163 A1 | 8/2010 | Eshghi et al. |
| 2010/0281081 A1 | 11/2010 | Stager et al. |
| 2010/0333116 A1 | 12/2010 | Prahlad et al. |
| 2011/0126099 A1 | 5/2011 | Anderson et al. |
| 2011/0131588 A1 | 6/2011 | Allam et al. |
| 2011/0145473 A1 | 6/2011 | Maheshwari |
| 2011/0161784 A1 | 6/2011 | Selinger et al. |
| 2011/0249147 A1 | 10/2011 | Ishii |
| 2012/0102503 A1 | 4/2012 | Meijer et al. |
| 2012/0109985 A1 | 5/2012 | Chandrasekaran |
| 2012/0151014 A1 | 6/2012 | Gokhale et al. |
| 2012/0198027 A1 | 8/2012 | Hetzler et al. |
| 2012/0259994 A1 | 10/2012 | Gillies et al. |
| 2013/0226931 A1 | 8/2013 | Hazel et al. |
| 2013/0275808 A1 | 10/2013 | McNeeney et al. |
| 2014/0006465 A1 | 1/2014 | Davis et al. |
| 2014/0089264 A1 | 3/2014 | Talagala et al. |
| 2014/0223115 A1 | 8/2014 | Dinkjian et al. |
| 2014/0325148 A1 | 10/2014 | Choi et al. |
| 2014/0365719 A1 | 12/2014 | Kuzmin et al. |
| 2015/0169449 A1 | 6/2015 | Barrell et al. |
| 2015/0172120 A1 | 6/2015 | Dwarampudi et al. |
| 2015/0205816 A1 | 7/2015 | Periyagaram et al. |
| 2015/0227602 A1 | 8/2015 | Ramu et al. |
| 2015/0261776 A1 | 9/2015 | Attarde et al. |
| 2015/0341212 A1 | 11/2015 | Hsiao et al. |
| 2015/0355862 A1 | 12/2015 | Hayes et al. |
| 2015/0363245 A1 | 12/2015 | Mutschler |
| 2016/0042008 A1 | 2/2016 | Tripathy et al. |
| 2016/0063080 A1 | 3/2016 | Nano et al. |
| 2016/0210061 A1 | 7/2016 | Soncodi et al. |
| 2016/0246713 A1 | 8/2016 | Choi et al. |
| 2016/0321287 A1 | 11/2016 | Luthra et al. |
| 2016/0337435 A1 | 11/2016 | Nigam et al. |
| 2016/0350324 A1 | 12/2016 | Wang et al. |
| 2016/0357476 A1 | 12/2016 | Chen et al. |
| 2017/0038978 A1 | 2/2017 | Li et al. |
| 2017/0075832 A1 | 3/2017 | Bhimani et al. |
| 2017/0075947 A1 | 3/2017 | Kurilov et al. |
| 2017/0123655 A1 | 5/2017 | Sinclair et al. |
| 2017/0177249 A1 | 6/2017 | Kurilov et al. |
| 2017/0177263 A1 | 6/2017 | Das et al. |
| 2017/0177546 A1 | 6/2017 | Heinz et al. |
| 2017/0212891 A1 | 7/2017 | Pundir et al. |
| 2017/0213127 A1 | 7/2017 | Duncan |
| 2017/0255392 A1 | 9/2017 | Nakashima |
| 2017/0289214 A1 | 10/2017 | Cho et al. |
| 2018/0101842 A1 | 4/2018 | Ventura et al. |
| 2018/0121307 A1 | 5/2018 | Braun et al. |
| 2018/0146018 A1 | 5/2018 | Chang et al. |
| 2018/0176244 A1 | 6/2018 | Gervais et al. |
| 2018/0184138 A1 | 6/2018 | Shaw et al. |
| 2018/0189175 A1 | 6/2018 | Ji et al. |
| 2018/0314727 A1 | 11/2018 | Epstein et al. |
| 2018/0329644 A1 | 11/2018 | Das et al. |
| 2018/0332325 A1 | 11/2018 | Kaitchuck |
| 2018/0332365 A1 | 11/2018 | Kaitchuck et al. |
| 2018/0332366 A1 | 11/2018 | Paduroiu |
| 2018/0332367 A1 | 11/2018 | Kaitchuck et al. |
| 2018/0336256 A1 | 11/2018 | Li et al. |
| 2018/0345140 A1 | 12/2018 | Posin |
| 2019/0004863 A1 | 1/2019 | Mainali et al. |
| 2019/0026301 A1 | 1/2019 | Wang et al. |
| 2019/0057138 A1 | 2/2019 | Knowles et al. |
| 2019/0129806 A1 | 5/2019 | Hsu et al. |
| 2019/0138494 A1 | 5/2019 | Inoue |
| 2019/0197173 A1 | 6/2019 | Tahara et al. |
| 2019/0278849 A1 | 9/2019 | Chandramouli et al. |
| 2019/0327297 A1* | 10/2019 | Madani .............. H04L 67/1048 |
| 2019/0332318 A1 | 10/2019 | Gooding et al. |
| 2019/0340180 A1 | 11/2019 | Bareness et al. |
| 2019/0349422 A1 | 11/2019 | Dhruvakumar et al. |
| 2020/0034468 A1 | 1/2020 | Lei et al. |
| 2020/0089420 A1 | 3/2020 | Sharoni et al. |
| 2020/0174695 A1 | 6/2020 | Bazarsky et al. |
| 2020/0250172 A1 | 8/2020 | Busjaeger et al. |
| 2020/0310686 A1 | 10/2020 | Truong et al. |
| 2020/0320005 A1 | 10/2020 | Shulman et al. |
| 2020/0344299 A1 | 10/2020 | Sohail et al. |
| 2020/0394196 A1 | 12/2020 | Shivanna et al. |
| 2020/0404011 A1 | 12/2020 | Gervais et al. |
| 2021/0110328 A1 | 4/2021 | Hsiao et al. |
| 2021/0124746 A1 | 4/2021 | Klaedtke |
| 2021/0157520 A1 | 5/2021 | Bavishi et al. |

(56) References Cited

U.S. PATENT DOCUMENTS

| | | |
|---|---|---|
| 2021/0256029 A1 | 8/2021 | Danilov et al. |
| 2021/0342296 A1 | 11/2021 | Danilov et al. |
| 2021/0342354 A1 | 11/2021 | Danilov et al. |
| 2021/0365211 A1 | 11/2021 | Danilov et al. |
| 2021/0374021 A1 | 12/2021 | Santhakumar et al. |
| 2022/0035533 A1 | 2/2022 | Danilov et al. |
| 2022/0182724 A1 | 6/2022 | Gupta et al. |

FOREIGN PATENT DOCUMENTS

| | | |
|---|---|---|
| CN | 1708029 | 12/2005 |
| CN | 104901958 | 9/2015 |
| CN | 105591926 | 5/2016 |
| GB | 2377038 | 12/2002 |
| WO | 2002101585 | 12/2002 |
| WO | 2004/080067 A1 | 9/2004 |
| WO | 2009014993 | 1/2009 |
| WO | 2015/196281 A1 | 12/2015 |
| WO | 2015191120 | 12/2015 |
| WO | 2018148149 | 8/2018 |

OTHER PUBLICATIONS

Office Action dated Jul. 15, 2022 for U.S. Appl. No. 16/864,905, 77 pages.

Office Action dated Sep. 1, 2022 for U.S. Appl. No. 16/944,094, 25 pages.

Office Action dated Jul. 21, 2022 for U.S. Appl. No. 17/070,029, 68 pages.

Notice of Allowance dated Aug. 24, 2022 for U.S. Appl. No. 17/152,544, 55 pages.

Office Action dated Sep. 15, 2022 for U.S. Appl. No. 17/383,425, 61 pages.

Phaujdar, "Understanding Event Streams—A Comprehensive Guide 101_ Learn Hevo" [https://hevodata.com/learn/understanding-event-streams/] (Feb. 17, 2021) (Year: 2021).

Dhanushka, "Understanding Kafka Topic Partitions" [https://medium.com/event-driven-utopia/understanding-kafka-topic-partitions-ae40f80552e8]—(Mar. 28, 2021) (Year: 2021).

Splunk, "Comparing Pulsar and Kafka" [https://www.splunk.com/en_us/blog/it/comparing-pulsar-and-kafka-how-a-segment-based-architecture-delivers-better-performance-scalability-and-resilience.html]—(Dec. 5, 2017) (Year: 2017).

Office Action dated Sep. 30, 2022 for U.S. Appl. No. 17/408,344, 66 pages.

Akidau et al., "MillWheel: Fault-Tolerant Stream Processing at Internet Scale" Proceedings of the VLDB Endowment, vol. 6, No. 11, 2013, 12 pages.

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Office Action dated Jan. 29, 2021 for U.S. Appl. No. 16/256,083, 42 pages.

Notice of Allowance dated Jun. 28, 2021 for U.S. Appl. No. 16/884,647, 39 pages.

Office Action dated Jun. 29, 2021 for U.S. Appl. No. 16/881,556, 24 pages.

Notice of Allowance dated Aug. 4, 2021 for U.S. Appl. No. 17/200,652, 51 pages.

Office Action dated Oct. 1, 2021 for U.S. Appl. No. 16/915,762, 57 pages.

Notice of Allowance dated Dec. 15, 2021 for U.S. Appl. No. 17/064,747, 54 pages.

Office Action dated Nov. 10, 2021 for U.S. Appl. No. 16/944,089, 75 pages.

Kleppmann, Martin. "Making Sense of Stream Processing—The Philosophy Behind Apache Kafka and Scalable Stream Data Platforms"; Mar. 4, 2016; retrieved from [https://hashingit.com/elements/research-resources/2016-03-04-making-sense-of-stream-processing.pdf] on Nov. 5, 2021, (Year: 2016), 183 pages.

Notice of Allowance dated Feb. 4, 2022 for U.S. Appl. No. 16/915,762, 57 pages.

Office Action dated Oct. 1, 2021 for U.S. Appl. No. 17/127,724, 41 pages.

Office Action dated Jan. 21, 2022 for U.S. Appl. No. 16/864,892, 26 pages.

Notice of Allowance dated Feb. 24, 2022 for U.S. Appl. No. 17/038,079, 55pgs.

Azhar et al., ""Efficient selection of access control systems through multi criteria analytical hierarchy process"", IEEE, doi: 10.1109/ICET.2012.6375419, 2012, pp. 1-8. (Year: 2012).

Rox et al., ""Construction and Deconstruction of Hierarchical Event Streams with Multiple Hierarchical Layers"", IEEE, doi: 10.1109/ECRTS.2008.13, 2008, pp. 201-210. (Year: 2008).

Notice of Allowance dated Feb. 18, 2022 for U.S. Appl. No. 17/083,145, 70pgs.

Office Action dated Mar. 21, 2022 for U.S. Appl. No. 16/864,905, 125 pgs.

Muskardin et al., "Implementation of Hashing Algorithms in Stream Mining", International Conference on Smart Systems and Technologies (SST), Oct. 2018, pp. 233-238.

Notice of Allowance dated Apr. 11, 2022 for U.S. Appl. No. 16/944,089, 87 pages.

J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154. (Year: 2014).

T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).

(56) References Cited

OTHER PUBLICATIONS

Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).

M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).

Office Action dated Apr. 20, 2022 for U.S. Appl. No. 16/944,094, 48 pages.

Office Action dated Apr. 12, 2022 for U.S. Appl. No. 17/038,102, 48 pages.

Notice of Allowance dated Apr. 27, 2022 for U.S. Appl. No. 17/127,724, 19 pages.

Office Action dated May 24, 2022 for U.S. Appl. No. 17/237,535, 62 pages.

Notice of Allowance dated Nov. 15, 2022 for U.S. Appl. No. 16/864,892, 48 pages.

Notice of Allowance dated Nov. 23, 2022 for U.S. Appl. No. 17/408,344, 35 pages.

Notice of Allowance dated Nov. 17, 2022 for U.S. Appl. No. 16/944,094, 23 pages.

Notice of Allowance received for U.S. Appl. No. 17/063,906, dated Feb. 6, 2023, 29 pages.

Notice of Allowance received for U.S. Appl. No. 17/383,425, dated Feb. 1, 2023, 37 pages.

Office Action dated Feb. 10, 2023 for U.S. Appl. No. 17/145,588, 78 pages.

Non-Final Office Action received for U.S. Appl. No. 17/063,906, dated Oct. 27, 2022, 59 pages.

Notice of Allowance received for U.S. Appl. No. 16/864,905, dated Nov. 30, 2022, 347 pages.

Tony Tung et al., "Topology Dictionary for 3D Video Understanding", IEEE Transactions on Pattern Analysis and Machine Intelligence (vol. 34, Issue: 8, Aug. 2012), Dec. 2011, pp. 1645-1657.

A. Bulut et al., "Distributed data streams indexing using content-based routing paradigm", 19th IEEE International Parallel and Distributed Processing Symposium, Apr. 2005, pp. 1-10.

Notice of Allowance received for U.S. Appl. No. 17/070,029, dated Dec. 2, 2022, 36 pages.

Non-Final Office Action received for U.S. Appl. No. 17/223,263, dated Nov. 28, 2022, 64 pages.

Non-Final Office Action received for U.S. Appl. No. 17/152,558, dated Dec. 7, 2022, 59 pages.

Non Final Office Action received for U.S. Appl. No. 17/976,574 dated Mar. 2, 2023, 55 pages.

Notice of Allowance received for U.S. Appl. No. 17/223,263, dated Apr. 6, 2023, 32 pages.

\* cited by examiner

US 11,681,460 B2

SCALING OF AN ORDERED EVENT STREAM BASED ON A WRITER GROUP CHARACTERISTIC

BACKGROUND

Conventional data storage techniques can employ an event stream, e.g., an event stream can store events in an order in which they are written to the event stream. As such, the events can be read from the event stream in the order in which they are written. To ensure that the reading order of events is not corrupted, one application is typically not permitted to use more than one instance of a reader, e.g., an application reading a stream with parallel reader instances can experience out of-order event reads. However, event order can be maintained by storing events according to parallel stream segments, which can each be read by a separate reader instance of a reader group without loss of order. Scaling of an event stream can enable changing a segment topography.

DETAILED DESCRIPTION

Figure 1:
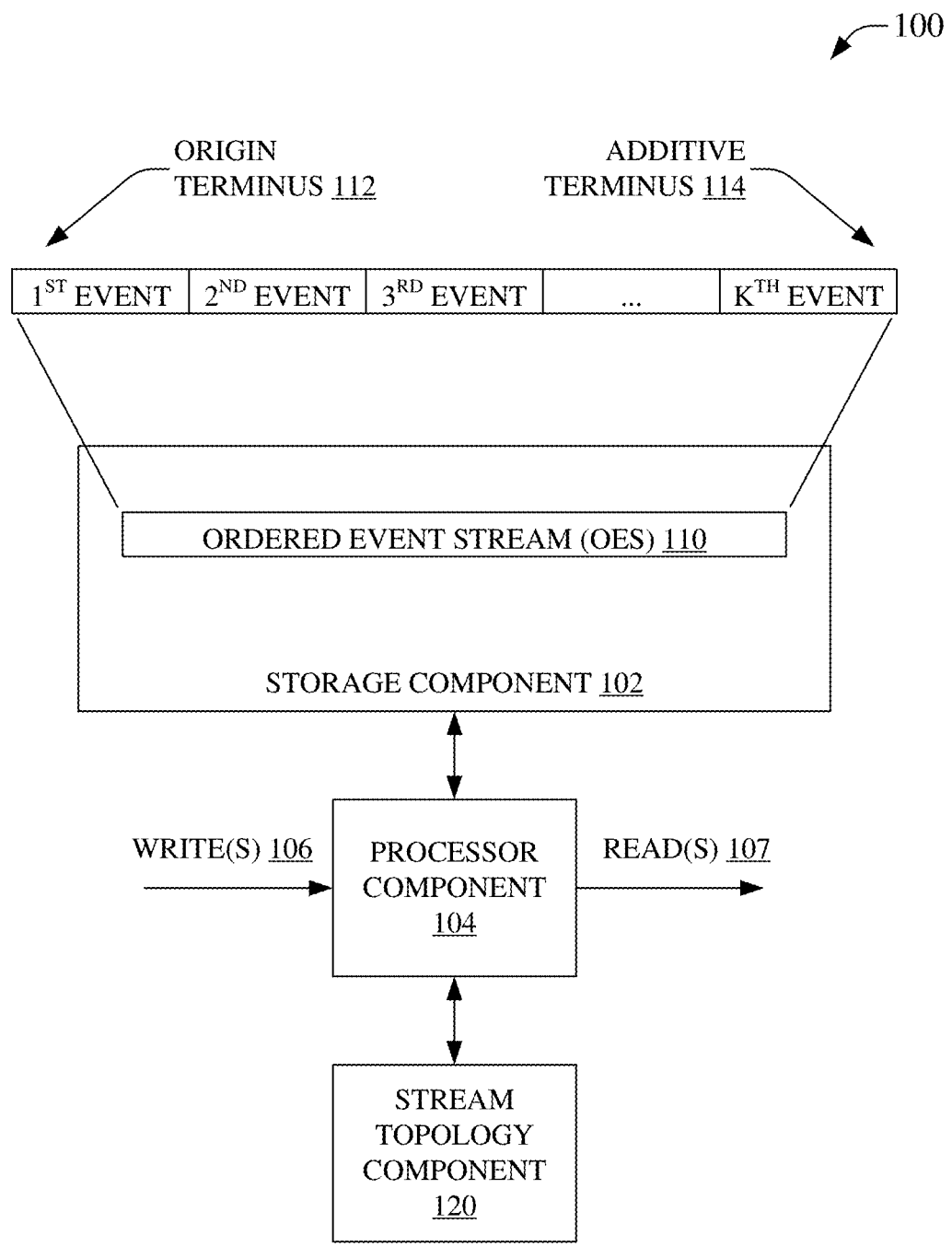
FIG. 1 is an illustration of an example embodiment that can facilitate scaling of an ordered event stream (OES), in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Controlling computing resource expense, while preserving stream event ordering, can be desirable. As such, improving the repertoire of data storage techniques for ordered event streams (OESs) can be an important aspect of developing event stream storage technology. An OES can store events according to an order in which they are received for writing into the OES, or portion thereof, facilitating reading events from the OES in the order in which they are written. Typically, even in modern OESs that can employ parallel segmentation, only one reader instance can be permitted to read from any segment of an OES where preservation of event order is to be guaranteed. Accordingly, scaling of OES segments can correspond to a degree of parallelism for an OES. Scaling an OES into a topology with more parallel segments can result in permitting more reader instances to operate in parallel while retaining ordering. Correspondingly, scaling that reduces the number of parallel segments can result in fewer reader instances where ordering is to remain intact.

Scaling an OES can comprise designating a portion of a hashed key space as corresponding to a segment of an OES, as is discussed elsewhere herein. Scaling can add more parallel segments, remove parallel segments, or change assignment of key space volume of a segment either with, or without, changing a count of parallel segments. As examples, an OES can go from two segments to three segments, can go from two segments to one segment, etc., correspondingly reflecting scaling up, scaling down, etc. Moreover, as an example, an OES can have two segments that evenly split a key space, and can be scaled to still have two segments, however a first segment, for example, can then cover 10% of the key space and a second segment can cover 80% of the key space, and 10% of the key space can be unassigned to a segment, e.g., the two segments can be rekeyed from a 50:50 spilt to a 10:80 split with 10% unassigned, reserved, etc. Numerous other examples are readily appreciated and are all within the scope of the present disclosure despite not being explicitly recited for the sake of clarity and brevity.

Event stream storage techniques, as a general example, can scale an event stream via bifurcation of a portion of the event stream into two other event stream portions. This can be in prompt response to an indication that computing resources have transitioned a threshold utilization level. These two other portions can generally represent an approximately even split of the initial event stream, e.g., each of the two resulting event stream portions can be about one half of the initial event stream in an attempt to divide the amount of computing resources used in the initial stream about evenly between the initial computing resources before the bifurcation of a stream and subsequent computing resources after bifurcation of the stream. This can be termed 'symmetrical scaling' of an event stream. As an example, if an initial event stream causes a load of two units of work for a first processor, the two units of work load can correspond to an even distribution of work across the associated key space of the initial event stream, and the two units of work can exceed a threshold work level of a first processor, the stream can therefore be split and a second processor can be employed in conjunction with the first processor, e.g., the first processor can supports a first portion of the stream at about one unit of work and a second portion of the stream can be supported at about one unit of work by a the now added second processor.

Additionally, a stream, e.g., an OES, can alternatively be split into dissimilar portions, termed 'asymmetrical scaling,' that can result in portions that are dissimilar in their coverage of an OES key space. Moreover, symmetric and asymmetric scaling can each result in one portion of an OES becoming two or more subsequent other portions of the OES, for example, symmetrical splitting of a stream into three similar portions. In one or more embodiments, these other portions can also comprise a mix of symmetric and asymmetric splits of the stream, for example, a first portion of a stream can be split into a second, third, and fourth portion, wherein the second and third can be similar, e.g., symmetric, and the fourth portion can be dissimilar from the second or third portion, e.g., asymmetric. In this example, the scaling can be referred to as 'mixed scaling,' e.g., implying that the subsequent portions of the stream after scaling can comprise a mix of symmetric and asymmetric portions. Scaling can operate to condense segments, for example going form more segments to fewer segments. This condensing can be symmetric, asymmetric, or mixed as well. As an example, condensing via scaling down can be in response to fewer parallel segments providing more efficient processor operation, e.g., rather than using 50 processors instances to read fifty events in parallel, it can be more efficient to use five processers to perform ten iterations of reading five events in parallel, for example where the ten iterations can be less costly and can still be performed in an acceptable amount of time, this can be considered more efficient than reading much faster at higher cost.

Scaling of the event stream can be in response to a threshold consumption of computing resources, e.g., when a threshold work level is traversed, an event stream can be scaled. In one or more embodiments, scaling can generally be associated with allocating computing operations to logical portions of an ordered stream of events. As an illustrative example, a first processor can satisfactorily write 5000 events per unit time to an ordered event stream, e.g., into storage corresponding to the ordered event stream, however, where the rate of events to be written to the stream, for example, doubles to 10000 events per unit time, the first processors can be determined to be underperforming due to being overly burdened and it can be desirable to scale the OES to compensate for overburdening of the first processor. As such, scaling can add a second processor such that the load on the first, and now the second, processors can be similar, e.g., the writing of the example 10000 events per unit time can be managed by two processors after the scaling rather than just the first processor before the scaling of the OES. As noted elsewhere herein, the scaling can be symmetric, asymmetric, or mixed scaling. It can be further noted that symmetric scaling of the logical key space of events can result in non-symmetric loading of computing resources. As an expansion of the previous example, where the first processor writes the 5000 events per unit time to event keys between 0 and 0.5 of the key space, and this load doubles as a result of an additional 5000 writes with an event key between 0 and 0.1 of the key space, then scaling the OES by symmetrically dividing the key space between the first processor from 0 to 0.25 and the second processor from 0.25 to 0.5 of the key space should not result in a symmetric division of computer resource loading, e.g., the first processor would now address a portion of the initial 5000 events and an additional burden from the 5000 events between 0 and 0.1 of the key space, while the second processor would address the initial 5000 events less the portion still being managed by the first processor. As such, mere equal division of a portion of an OES that is ignorant of the distribution of work across a key space of the event stream can be less effective that might otherwise be desired. Improved scaling technologies can be considerate of a resulting workload and, for example, can accommodate asymmetric scaling of a portion of an OES key space, such that resulting workloads can be more evenly distributed to available computing resources. Moreover, advanced scaling techniques can perform scaling intelligently to burden portions of available computing resources according to the performance, capability, metrics, etc., of the individual portions of the available resources, e.g., adding an additional mid-range processor can result in a different scaling than adding another high-end processor. As an example, scaling can be deferred, such as where the deferral can reduce consumption of computing resources, e.g., committing a scaling event can consume computing resources so it can be desirable to limit scaling to be in response to determining that the scaling would be beneficial despite using resources to commit the scaling event.

The reading of events from the stream can be spread among parallel reader instances that can be supported by one or more processors, e.g., one or more threads of a processor, one or more cooperating processors, etc. One or more reader instances, e.g., readers, can comprise a reader group, e.g., a group of reader instances can read from an OES for an application. It is noted that reader instances for different applications can simultaneously read from the same OES/segment. As an example, for application A with a first reader and application B with a second reader, both the first and second readers can read from an OES without loss of order. However, this is different from application A having a first and second reader, wherein reading events from the same OES/segment with both readers can result in a loss of event order. As such, discussions of readers, reader groups, etc., are intended to be in the context of a single application unless otherwise indicated otherwise explicitly or by context. Accordingly, a reader group for an application can comprise one or more reader instance that can read from one or more segments of an OES. The reader group can apply one reader instance to each segment of the OES without risking out-of-order event reads. It can follow that, the greater the number of parallel segments, the more parallel reader instances can be deployed while preserving event order. However, the greater the number of parallel segments, the higher the likelihood that a reader instance can be underutilized. Moreover, scaling of an OES to change the topology of corresponding OES segments can consume additional computer resources, e.g., processor cycles, memory, storage space, network resources, etc., can be burdened to alter key space allocation in an OES.

A writer group can comprise one or more writer instances. A writer instance can generally write to any portion/segment of an OES. However, writer instances for an application can be limited to segments to improve writing events according to an order, e.g., as data for an event is received, a writer instance can write it to a segment. Where the example writer instance does not compete with other writer instances, then the order in the segment/portion of the OES can reflect the order in which the data was received for writing to the OES. Having fewer writer instance than segments can still allow order preservation where writer instances control writing to affiliated segments and do not compete with other writer instances. It can be appreciated that where two writer instance serve a same segment, then where a first data is written more slowly by a first writer instance than a second data by a second writer instance, then event order can be compromised in that segment. In an aspect, adding more writers to a writer group can also increase the speed of writing events to portions of an OES, different OESs, etc., by allowing parallelism where well controlled if proper ordering is to be ensured, e.g., two writing instance writing events to a same segment can be controlled, for example, to have each writer instance write to designated key spaces of the segment in a virtual segment technique, that the writer instances of the writer group coordinate writing so that event order in the segment is preserved, etc. As an example, a first writer instance can write to a first segment and permission for another writer to write to the same segment can be predicated on the first writer instance indicating that the writing of the event to the first segment is completed, as such, writing of events to a same portion of an OES by different writer instances can be controlled/coordinated to write events in an order, for example writing events in a same order as data is received to be incorporated in to written events of the OES.

In view of the additional resources that can be consumed to scale an OES, it can be beneficial to scale an OES as events are written to the OES. As an example, writing events to a single segment OES and then later coming back and scaling the OES into two segments can be associated with consuming more computing resources than determining during the writing of events into the single segment that a count of events being written to a portion of the OES key space has transitioned a threshold level and correspondingly scaling the OES such that subsequent events are written into two parallel segments of the OES. The presently disclosed subject matter can support such scalable writing of events, e.g., scaling an OES based on a characteristic(s) of a writer group.

While a writer instance, unlike a reader instance, can write into any portion of an OES, e.g., based on a determined hashed key, etc., without compromising event ordering, e.g., as long as more than one writer instance is not writing into a same segment of an OES for a single application, scaling a writer group to include more writer instances can provide faster writing of events in a manner similar to adding more reader instances to a reader group can speed up reading events. More writer instances can be beneficial in allowing controlled parallel writing in an OES, e.g., more events can be written in a unit time where there are more writer instances available, and a number of queued events exceeds a rate of a writer instance. A group of writer instances for an application writing to an OES, e.g., a writer group, can be associated with a writing speed, rate, etc.

Generally, in view of the above, use of a writer group can favorably reduce queueing of events to be written by allowing them to be written more quickly. What is not obvious is that a characteristics of a writer group can also facilitate scaling of an OES. A writer group can generate information indicating where in a key space of an OES events are being written. This information can be used to determine a density of events across an OES key space, for example, over time. A threshold event density can then be used to trigger scaling of an OES during writing from a group of writers. In an embodiment, OES scaling can therefore correspond to analysis of event density of the OES. However, alternatively, a count of writer instances can be employed in triggering OES scaling. This technique can stem from associating each writing instance with a writing rate, then, where the count of writing instances changes, the rate of event writes can change correspondingly, which can be associated with a change in event density. As an example, where a writer group increases in size to accommodate writing more events to an OES, then the density of the OES can be expected to also be increasing. Scaling of the OES can therefore be employed to write events into segments of the OES in a manner that facilitates later reading of the events from the OES. In a similar example, contraction of a writer group to comprise fewer writer instances can correspond to writing fewer events to the OES, e.g., reducing event density, and scaling of the OES can be employed to proactively compensate in support of future reader instances. While not necessarily as accurate as analysis of event density of a stream or portion thereof, the analysis of event density can be substantially slower than an indication of a change in a count of writer instance comprising a writer group. As such, scaling an OES based on a characteristic(s) of a writer group, e.g., count of writer instances, etc., can be a fast and effective technique for storing events in a readily accessible manner that can forestall later scaling at the time of reading events. In a more detailed example, where readers can read one event per unit time, then writing four events into a single OES segment can be predicted to consume four units time to read these events from the OES in the future. Where a writer instance can write one event per unit time, then increasing from one writer to four writers can be associated with going from writing one event per unit time to writing four events per unit time. A change in the writer group can therefore be used to trigger scaling of the OES. In this example, going to four writer instances can trigger scaling the OES, for example, from one segment to four segments, whereby four events can be written per unit time across the four segments by the four writer instances of the example writer group. This can result in future reads of the OES permitting reading the OES at four events per unit time by employing four parallel reader instances. This can quadruple the rate of event reads without risking loss of event ordering. Moreover, the scaling can have occurred contemporaneously with writing events, which can be less costly in terms of computing resources than scaling that is not contemporaneous with writing events to an OES.

Additionally, writer group characteristic based OES scaling can be beneficial in OES operations that can employ cascading scaling. An event can be read from a first OES, used, and can cause another event to be written to another OES, another segment of an OES, etc. As an example, a first OES can store time clock events for employees. These events can be read, used to determine a number of hours worked, which can be multiplied by an hourly wage value, and the result can be written to a payroll OES. All employee time clock events can be written to a clock OES in this example. Accordingly, a single reader can likely easily read through the clock OES in a reasonable time frame for a small company with few employees. However, for a large company, with many employees each having many time clock events, it can be desirable to read more events faster without loss of event ordering. Scaling of the clock OES can certainly permit reading more events per unit time form the clock OES. However, this scaling can traditionally be dissociated from scaling of the payroll OES, e.g., even though more events are being read per unit time, which can result in more payroll events needing to be written, which can be associated with an increase in density of the payroll OES, scaling of the payroll OES can conventionally occur when later reading payroll events. However, scaling of the payroll OES contemporaneous to writing into the payroll OES can, as is disclosed herein, be triggered based on a writer group characteristic. The writer instance writing to the payroll OES can indicate a growing queue, an increase in the number of events written per unit time, etc., which trigger contemporaneous scaling of the payroll OES. A writer group characteristic can therefore comprise a performance of a writer instance(s) of a writer group, a count of writer instance(s) of a writer group, a change in a count of writer instance(s) of a writer group, an event processing speed, an event processing rate, a density of event writes into segment(s)/OES(s), or other characteristics affiliated with writing events into OESs or portions thereof. Moreover, where the writer group adds additional writing instances to address an increase in a rate of writing data to the payroll OES, this can also contemporaneously trigger scaling of the payroll OES. This can cause the payroll OES scaling to appear to be 'tracking' the scaling of the clock OES in this example, e.g., the scaling of the clock OES can cascade to the payroll OES via the writer group writing events into the payroll OES based on events read from the clock OES. This scaling of the payroll OES can benefit by writing events thereto according to the scaled payroll OES topology so that future reads of the payroll OES topology can occur perhaps without further needing to scale the payroll OES at the time of reading events.

Additionally, the cascading of scaling based on a writer group characteristic(s) can be useful where there can be multiple cascades, e.g., reading from an input OES that results in writing to and reading from one or more layers of interim OESs/segment(s), then to an output OES. Typically, management of scaling contemporaneous with reading from each of the input and interim OESs can be generally difficult to manage. Accordingly, scaling based on writer groups contemporaneous with writing into the interim and output OESs can be easier to manage. These and other embodiments are disclosed more fully elsewhere herein.

In general, a stream can be a durable, elastic, append-only, unbounded sequence of so-called events. An event can be added to a head of a stream of events, e.g., a first event can be considered as residing at a tail of the event stream and a most recent event can be regarded as residing at the head of the stream with other events ordered between the tail and the head of the stream. The events need not be stored in contiguous storage locations to be logically sequenced in the stream representation, e.g., a first event can be stored on a first disk, a second event on a remotely located second disk, and a third event stored at a further remote third disk, the stream can logically sequence the first, second, and third events by reference to their stored data in different physical locations, the OES can be regarded as an abstraction comprising the events in an ordered manner. It is noted that some stream storage systems can employ an alternative head/tail terminology, for example, a first event can be added at a head of an OES, while subsequent new events can then be added sequentially to a tail of the OES, however, this is indistinguishable in all other ways from the head/tail convention generally employed in the instant disclosure, e.g., an event is still part of a sequence of events and corresponds to a key. Every event of the stream can be associated with a routing key, or simply key for convenience. A key can often be derived from data of the event, e.g., a "machine-id," "location," "device type," "customer number," "vehicle identifier," etc. In one or more embodiments, an event can be associated with a key, however, data yet to be written to an event can be associated with an access target value that can be the same value as the key, e.g., the access target value can be determined based on the data of the event, a characteristic corresponding to the event to be recorded, etc., such that the access target value can be regarded to be the same as the key. Accordingly, the term event key, hashed key value, access target value, key, etc., can be used interchangeably for convenience unless the context indicates a more specific use, for example, a access target value can correspond to data to be stored in an event and can be derived from that data or other characteristics corresponding to the data such that when the event is stored the access target value can be used as the key associated with storing the event. Similarly, in a read operation, an access target value can be indicated to allow access to an event having a key that matches the access target value because the event was written to the OES according to a key that can be the same as the access target value. Generally speaking, the term access target value can relate to a "key's" value such that access to events of an OES can be based on comparing the access target value to key values for actual stored events, where an existing event is to be read, or key values that will be used to store an event, where an event will be written into the OES at the access target value. Again, it is generally easier to just use the term key for both access target value and routing key unless more specificity is needed in some given example, and this convention is generally used in the instant disclosure for simplicity and brevity. Events with the same routing key can be written to a corresponding stream or stream segment, and can also be consumed, e.g., read, in the order they were written to the stream or stream segment.

A stream can be comprised of a group of portions, e.g., shards, partitions, pieces, etc., that can generally be referred to as stream segments, or simply segments for convenience. The segments can act as logical containers for one or more events within a stream, e.g., it is understood that events written to geographically disparate data storage devices can logically be written to the same stream segment, e.g., same logical container, according to the instant disclosure. When a new event is written to a stream, it can be stored to a segment of the stream based on a corresponding key. Event routing keys can be hashed to form a "key space". The key space can be employed to divide the stream into a number of parts, e.g., segments. In some embodiments, consistent hashing can be employed to assign events to appropriate segments. As an example, where a stream comprises only one segment, all events to be written to the stream are written to the same segment in an ordered manner and the segment corresponds to the entire key space. As another example, where a stream comprises two segments, the key space of the event, e.g., from zero to 'n', can be associated with the two segments, however each of the two segments can be associated with a portion of the total key space, for example, the first segment can store events with a key between zero and 'm' and the second segment can store events with a key between 'm+1' and 'n'. It will be appreciated that more segments can serve to further divide the key space such that a segment can store an event with a key falling within the range of the key space associated with that segment. As an example, a four-segment event stream can have each segment store data for a quarter of the total key space, e.g., segment A can store events with keys from 0 to <0.25, segment B can store events with keys from 0.25 to <0.5, segment C can store events with keys from 0.5 to <0.75, and segment D can store events with keys from 0.75 to 1.0.

In one or more embodiments, a segment of an event stream is generally associated with a single processing instance to assure ordering of the events stored in the segment. A processing instance can be a single real physical processor, a virtualized processor instance executing on one or more real physical processors, a group of real physical processors, a group pf virtual processor instances executing on one or more real physical processors, etc. As an example, a processing instance can be embodied via a blade server in a computing facility. As another example, a processing instance can be a virtual processor deployed in an elastic computing system, e.g., a 'cloud server,' etc.

Typically, a processing instance can be associated with a level of performance which, in some embodiments, can be measured via one or more key performance indicators (KPIs) for the processing instance. As an example, a first blade server can have a first level of performance and a second blade server can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed by the processing instances, e.g., reads, writes, etc. In this example, the first and second processing instances can perform similar amounts of work in an event stream storage system, while the third processing instance can be capable of up to five times the work of either the first or second processing instance. Generally, the computing resources of a processing instance can be associated with costs, e.g., monetary costs, electrical consumption costs, dispersion of generated heat costs, support costs, real estate for deployment costs, operations per unit time as a cost, etc. As such, selecting an appropriate processing instance can be associated with optimizing cost. As an example, if an event stream typically consumes less than one unit of work, then pairing the stream with a processing instance that can perform one unit of work can be a better use of computing resources, e.g., lower overall aggregate costs, etc., than pairing the even stream with a processing instance that can perform 200 units of work which can result in wasting up to 199 units of work through underutilization. Moreover, in this example, the 200-unit processing instance, for example, can be a newer high end processing instance that can have a high monetary cost, and generate more heat than the one-unit processing instance that, for example, can be a low-cost commodity processing instance that is plentiful, has a low monetary cost, and is already widely deployed. As such, pairing the one unit of work event stream with a racecar of a performance instance can be understood as possibly not being an optimal pairing in comparison to a more pedestrian performance instance.

In one or more embodiments, a segment can be scaled where a threshold level of performance occurs. As an example, an event stream segment can typically consume less than one unit of work, e.g., one unit of computing resources, and the stream segment can be associated with a processing instance that can perform up to one unit of work. However, in this example, where the segment increases demand to 1.5 units of work, it can be desirable to scale the segment, e.g., split into two daughter segments, such that each daughter segment can be associated with events for a portion of the key space of the parent segment prior to a scaling event. In this example, where the daughter segments can each be associated with a processing instance that can perform one unit of work, and where the key space of the initial segment can have a generally even distribution of work, then each daughter segment, for example, can be associated with about 0.75 units of work, e.g., about evenly splitting the 1.5 units of work of the parent segment in this example. As such, the parent segment exceeding the capacity of the existing processing instance can correspond to a scaling event that can split the parent into two daughter segments that can each then experience about 0.75 units of work.

It is noted that prompt scaling, in some instances, can be undesirable in comparison to deferring scaling, for example, where prompt scaling can result less than a threshold level of change in consumption of computing resources. As a first example, where an OES can have only one available processor, then scaling of this example OES can result in the one processor still supporting the full computing load despite committing the example scaling event. In fact, in this first example, scaling the OES can counterintuitively increase the load on the example single processors by adding computing tasks corresponding to the committing of the scaling event itself. It can be readily appreciated in this example, without additional computing resources, scaling can fail to achieve the desired goal of better distribution of computing resource demands and can even be counterproductive by increasing loading of the example processor to perform the scaling itself. In an extreme version of this example, the additional load on the example single processor can trigger further scaling, e.g., in a poorly controlled feedback loop, that could result in crashing the stream storage system by overburdening the example processor with computational demands related to the now looping scaling. In a second example, symmetric scaling of asymmetrically loaded streams can result in adding segments that may not effectively aid in distributing workload of the OES storage system to additional computing resources. In this second example, a segment that becomes heavily loaded in a narrow band of keys can be poorly served by symmetric scaling where newly added computing resources may not effectively receive a sufficiently large portion of the work associated with the narrow band of keys. As a third example, scaling that is not based on performance of computing resources can result in poor distribution of work via scaling. In this third example, scaling that evenly divides a large workload between an existing high-end processor and a newly added low-end processor can result in highly over burdening the newly added processor, which can clearly be undesirable. In a fourth example, frequent/prompt scaling can be problematic in that it can consume computing resources to commit a scaling event that can be in response to a change in demand that can be transient, e.g., heuristic control can limit scaling event oscillation that otherwise could consume substantial computing resources. Deferring scaling of an OES can result in not immediately consuming computing resources associated with committing a scaling event.

Where a projected level of improvement for a possible scaling event is insufficient, e.g., a determined benefit of a possible scaling event does not satisfy a rule permitting the scaling event to be performed, the scaling event can be deferred. In one or more embodiments, the deferral can comprise declining to perform the scaling event. Failure to satisfy the rule can result in later computing another scaling event benefit and again determining if the rule to permit scaling is satisfied, e.g., iteratively determining permission to commit a scaling event based on current states of an OES storage system. However, failure to satisfy the rule can also result in virtually committing the scaling event, e.g., not actually committing the scaling event, but rather storing a state of the OES according to a model of having applied the scaling event. In one or more embodiments, this 'virtual scaling event' can result in no actual change to the OES in comparison to committing the scaling event in reality, however, the OES can act as if the scaling event had been committed in regard to further scaling events. The state of the OES after the virtual scaling can be employed in determining if a future scaling event satisfies the permission to commit a scaling event rule. As an example, an OES in state A can trigger a scaling analysis that can result in the permission rule not being satisfied. In this example, the OES would not commit the scaling event. As such, in this example, the OES can remain in state A and at some future point can perform another scaling event analysis according to the OES conditions at that future time. However, as is disclosed herein, the OES can virtually commit the scaling such that the OES physically remains in state A but stores a scaling waypoint of the OES being in state B. As such, in this example, future scaling event analysis can determine if scaling from state B is permitted by satisfying another instance of the permission rule. Where the future scaling analysis is permissive, then the scaling of OES can be from state A to state C via virtual state B. In one or more embodiments, use of virtual scaling can preserve the computations, analysis, etc., performed in relation to the virtual scaling event so that they do not need to be redetermined, e.g., the analysis has already been performed so there is no reason to throw out these values, even if the values are insufficient to commit a scaling event in reality. However, because the virtual scaling event is not committed in reality, any eventual real commitment of a future scaling event can leverage the state of the OES determined for an interviewing virtual scaling event. Moreover, virtual scaling events can be ignored, such as where an OES environment has substantially changed, where the conditions resulting in the virtual scaling have reverted, etc. As an example, a virtual scaling can be determined for an OES based on a change in demand but a lack of additional available computing resources. In this example, addition of more computing resources can enable real commitment of the virtual scaling event. Also, in this example, where the demand reverts to the pre-virtual scaling level, the virtual scaling can simply be deleted because it was never actually committed. Additionally, in this example, where demand continues to increase and where additional computing resources become available, the virtual scaling state can be employed in an analysis of another scaling event that can be determined based, in part, on the virtual scaling and the subsequent changes in the OES environment.

As is noted, committing a scaling event can entail consuming additional processing; reassignment of writing instances that write events to, and/or reading instances that read events from, the segment(s) of the stream, adding effort and expense spooling up/down processing instances, purchasing additional network resources, dedicating time commitments from a technology support group, etc. As such, scaling is generally not to be performed without determining that an adequate impact on an event stream storage system can result from committing the scaling event. As an example, scaling during an intermittent or transient change in demand for computing resources, e.g., brief and changing increases/decreases in needed work capacity for a stream segment, can be disfavored because a determined benefit can be outweighed by a determined cost, e.g., monetary and/or non-monetary cost, to commit one or more corresponding scaling event(s), although the scaling can be performed where the determined benefit is sufficient in comparison to the determined cost. Typically scaling is desirable where there exists a determined longer-term benefit. As such, a threshold value less than the maximum work that can be performed by a computing instance can be associated with determining if a scaling event will be undertaken. As an example, where a parent segment reaches 80% of a threshold level of work, a benefit value of scaling the segment can be determined to be sufficiently high to commit a scaling event, e.g., where the benefit value satisfies a scaling rule, the parent segment can then be scaled into daughter segments. The benefit value can be determined based on an expected performance of the daughter segments. As an example, if the parent segment reaches 80% consumption of computing resources, e.g., 80% work, then where the key space is evenly distributed, each daughter can be expected to inherit 40% consumption of the computing resources where each processing instance is generally capable of about one unit of work. This results in each processing instance consuming 40% less work than the parent and can leave sufficient available computing resources to allow for further increase in each of the daughter segments that could be difficult for the parent to manage without scaling. This level of improvement and the resulting daughter segments being under an example threshold of 80% consumption of corresponding processing instance resources can be determined to satisfy the scaling rule and the segment can be scaled up. It is noted that the example daughter segments can later be scaled down, e.g., combined into a single segment, combined with other segments, etc., for example, where the daughter segments begin to consume less than, for example, 20% of the available computing resources, they can be scaled down into one granddaughter segment that can consume about 40% of a single processing instance. Further discussion of scaling down is generally not discussed herein for clarity and brevity, however it is expressly noted that scaling down is fully supported by the disclosed subject matter and is accordingly within the scope of the instant disclosure.

In one or more embodiments, distribution of events across a key space of an OES, or portion thereof, can be non-uniform. As an example, if an event stream has one segment that begins to consume 0.9 units of computing resources and is supported by a processing instance that can provide one unit of work with a scaling threshold value of 0.8 units, scaling can result in two daughter segments that each can consume 0.45 units of work where the work is generally evenly distributed across the key space of the parent segment, e.g., as is illustrated in an above example. However, where the distribution of work is non-uniform across the key space of the segment, for example where 0.8 units of the demand occurs in the lower half of the key space for the parent stream and only 0.1 units occurs in the upper half of the key space, then dividing the key space into daughters through symmetrical scaling, e.g., one taking the bottom half and one taking the top half of the key space, can result in one daughter segment having 0.8 units of demand and the other daughter segment having 0.1 units of demand. The daughter having 0.8 units of demand can already be ready for further scaling where the scaling threshold is 0.8 units. Use of asymmetric scaling, as disclosed elsewhere herein, can result in a more equitable scaling, e.g., the first daughter can inherit a portion of the parent key space having a work demand similar to the work demand from the balance of the parent key space. As such, the key space can be assigned to the daughter segments asymmetrically to enable balancing of work demanded by the resulting daughter segments.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate scaling of an ordered event stream, in accordance with one or more embodiments of the subject disclosure. System 100 can comprise a storage component 102 that can store an ordered event stream (OES) 110. OES 110 can store one or more events. An event is associated with a key, e.g., a routing key. A key can typically be determined from aspects of the corresponding event, although other key determination techniques can be employed. As an example, a key can be based on a characteristic of the source of the event data, such as a customer identifier, machine identifier, a location of a device providing the event data, a type of a device providing the event data, etc. Events with a same key can be written into OES 110 in an ordered manner according to the key. Similarly, events with a same key can be read from OES 110 in an ordered manner, e.g., in the order they were previously written into OES 110. Components providing events to be written can be termed 'writers' and components requesting events can be termed 'readers.' As such, a writer can provide an event that can be written to OES 110 in an ordered manner based on a key associated with the event. Similarly, a reader can receive an event from OES 110 based on a key.

Processor component 104 of a system 100 can receive write(s) 106 that can be written to OES 110 stored on storage component 102. Processor component 104 of a system 100 can provide access to events of OES 110 based on a key, e.g., as read(s)107 that can be communicated to a reader. Generally, one processing instance, e.g., processor component 104, etc., is designated for writing events to a portion, e.g., segment, of OES 110. OES 110 can comprise one segment and/or parallel segments, e.g., stream segments, see FIG. 2, etc., that can store events according to a key. In an example embodiment, more than one processing instance writing to a segment of an OES is typically disfavored because it can increase the difficulty of writing incoming events in an ordered manner. However, a given processing instance can read/write to more than one OES segment, e.g., a given processing instance can write to one or more OESs, to one or more segments of one OES, to one or more segments of one or more OESs, etc. In an example embodiment, while more than one processing instance writing to a segment of an OES is typically disfavored, more than one processing instance reading from a segment it fully supported. As such, for a given number of segments, in some embodiments, there can be up to the same number of processing instances, e.g., to limit more than one processor instance writing to a segment. Although adding more processing instances is allowable, for example to increase read operations, these additional processing instances can be constrained to read operations to limit the possibility of scrambling an order of events being written to a segment. It is further noted that system 100 can comprise idle processing instances that are not reading or writing to the OES, for example as reserve processing instances supporting failover operations protecting against an active processing instance becoming less responsive, in support of scaling events, etc. In one or more embodiments, keys of one or more segments of an OES can represent a key space for OES 110, see FIG. 2, etc. Segments can therefore act as logical containers associated with a particular range of keys for a portion of an event stream and can be used to store events of OES 110. When a new event is written to a stream, it can be stored to a segment based on the event key. In an example embodiment, the key space can be divided into a number of ranges that can correspond to the number of segments comprising an OES, e.g., OES 110. As an example, a key space for an OES can be from 0 to 100, the OES can comprise two parallel segments wherein the first segment can sequentially store events with, for example, keys from 0 to 30, and the second segment can sequentially store events with keys from >30 to 100. In this example, a first event with a key of 54 can be appended to the second segment, a second event with a key of 29 can be appended to the first segment, a third event with a key of 14 can be further appended to the first segment after the second event, etc. In an example embodiment, storage component 102 can store one or more OESs, although only OES 110 is illustrated for clarity and brevity.

OES 110, as illustrated in system 100, can be an overly simplistic example of an OES that can comprise just one segment for storing incoming event write(s) 106 and sourcing event read(s) 107, and therefore the key space of OES 110 can be embodied in the illustrated single segment of events, e.g., the key space of OES 110 is not illustrated as being distributed across more than one parallel event storage segment. OES 110 can have an origin terminus 112. A first event can be written at origin terminus 112. The subsequent events can then be appended at an additive terminus 114 that is typically always at the head of the stream of written ordered events, e.g., a most recent event is written to the head of OES 110, which provides ordering of the events being written. This results in OES 110 allowing for continuous and unbounded data storage that can be a durable, elastic, append-only, unbounded sequence of events. As an example, a $(K+1)^{th}$ event can be appended to the $K^{th}$ event of OES 110 at additive terminus 114. In an example embodiment, storage component 102 can store any number of OESs. Moreover, any one OES can comprise any number of parallel segments, e.g., stings of events for a defined key space range. Each segment can comprise an ordered sequence of stored events.

In system 100, stream topology component 120 can facilitate adapting a topology of one or more OESs. In one or more embodiments, the adapting of the topology can comprise scaling of OES 110. Scaling can comprise 'scaling up,' e.g., increasing a count of parallel segments of OES 110, 'scaling down,' e.g., decreasing a count of parallel segments of OES 110, etc. As an example, increasing a number of parallel segments of OES 110 can result in division of the key space of OES 110 from one segment to two or more parallel segments. In one or more embodiments, it can be desirable to scale up a segment of an OES, e.g., OES 110, when a threshold consumption of computing resources is transitioned. The threshold consumption of computing resources can, in an embodiment, correspond to a level of performance of a related processing instance, e.g., processor component 104. As an example, if a processing instance, e.g., processor component 104, can perform 100 million operations per day, e.g., reads, writes, etc., an example threshold of 80 million operations can be selected. Accordingly, in this example, where OES 110 generally performs less than 80 million operations per day, scaling of OES 110 can be determined to be unnecessary. However, in this example, where events for OES 110 increase, for example to 82 million operations per day, scaling of OES 110, e.g., scaling up, can be indicated, for example to avoid overburdening processor component 104, etc.

Where scaling of OES 110, in the above example, is determined to be appropriate, stream topology component 120 can facilitate altering the topology of OES 110 from one segment to two or more parallel segments. This can result in dividing the key space of OES 110 among the now plural parallel segments. In one or more embodiments, processor component 104 can continue to perform all operations for the parallel segments, e.g., processor component 104 can read/write to more than one segment of events as is noted elsewhere herein, although this can fail to avoid possible overburdening of the processor in the above example. However, in some embodiments, one or more additional processing instances can be deployed to provide additional computing resources. It is noted that adding an additional processing instance without scaling up OES 110 can result in the newly added processing instance remaining idle because more than one processing instance is typically not allowed to write events into a segment of an OES to prevent scrambling the order of events. However, upon scaling up OES 110, for example, to two parallel segments, the addition of another processing instance can now be dedicated to one of the two parallel segments, e.g., one segment can typically be supported by up to one processing instance, two segments can be supported by up to two processing instances, three segments can be supported by up to three processing instances, . . . , w segments can be supported by up to w processing instances, etc. It is again noted that additional processor instances can be dedicated to read events, e.g., read(s) 107, whereby the count of processors can often exceed the count of segments.

Scaling up can increase a count of parallel segments of OES 110. There can also be an increase in the count of processing instances, e.g., additional instances of processor component 104 that are not illustrated. Scaling up can be enabled via stream topology component 120, e.g., based on one or more OES characteristics (OESCs), Based on storage system key performance indicators (KPIs), etc. Example OES characteristics can comprise a current computing resource demand, a count of segments, a distribution of work among the segments, a topology of an OES, a historical workload of one or more segments of an OES, etc. Example storage system KPIs can comprise loading of a processing instance, e.g., how heavily burdened is processor component 104, etc., threshold values for current and/or available computing resources, etc. Similarly, scaling down can be supported by stream topology component 120. As an example, where the number of operations performed in two parallel segments decreases, the lower levels of work being performed can be viewed as wasteful of processing instances allocated to these two example stream segments. As such, the segments can be condensed and one of the processing instances can be released. In some embodiments, the superfluous processing instance can be released without condensing the two example streams, e.g., there is generally no prohibition to one processing instance supporting two stream segments. While scaling down is not discussed at length for the sake of clarity and brevity, scaling down can be complementary to scaling up and all such complimentary operations are fully supported by the instant disclosure even where not explicitly recited. It is further noted that scaling up/down is generally associated with additional temporary burdening of computation resources, e.g., to remap reader(s) and/or writer(s) from a pre-scaling topology to an after-scaling topology, sealing pre-scaling segments, instantiating and/or releasing processing instances, providing a connection (bridging) between events of a pre-scaling stream to events of a prost-scaling stream, etc. As such, it is generally undesirable to arbitrarily scale OES 110, e.g., committing a scaling event is not 'free' and so can be limited to where it is 'cost effective' to commit the scaling event. Accordingly, scaling can be initiated in response to determining that the scaling likely will result in a topology that is determined to satisfy a scaling rule, as is discussed elsewhere herein.

In an embodiment, scaling can be based on writing of events, such as scaling based on a count of writer instances in a writer group, or some other writer group characteristic(s). A writer group can comprise one or more writer instances for an application writing to one or more segments of one or more OESs. Where writer instances increase, an OES can be correspondingly scaled up, e.g., increasing a count of segments in an OES, adding additional OESs, etc. Similarly, where a count of writer instances in writer group decreases, an OES can be scaled down, e.g., to reduce a count of segments in an OES, a count of OESs being written to, etc. In some embodiments, scaling can reallocate the key spaced with, or without, changing a count of segments/OESs. As an example, increasing a count of writer instance sin a writer group can correspond to more dense events in a segment of an OES. In this example, reallocating the portion of the OES key space of the OES can result in the increased event density being shared by more segments even without increasing the overall count of segments of the OES, for example, reallocating a low-density segment to a portion of the higher-density segment can result in a more balanced density for the same two OES segments. The writer-group-based scaling can be performed, enabled, facilities, etc., by stream topology component 120, or other components of system 100.

Figure 2:
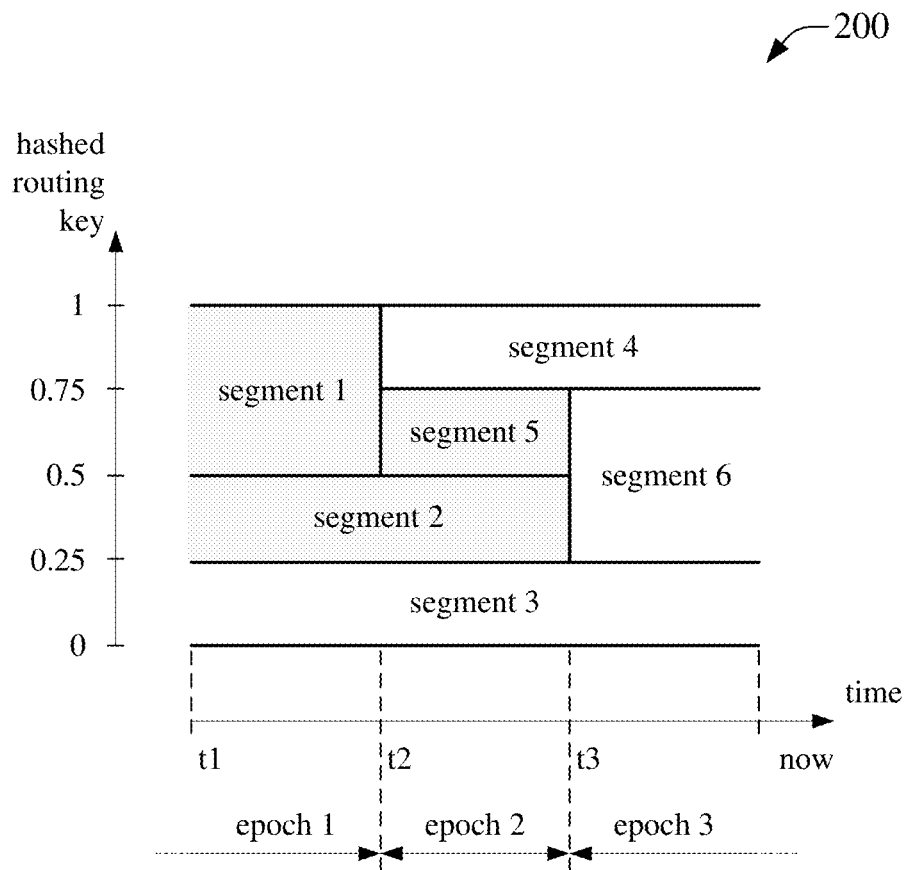
FIG. 2 is an illustration of an example scaling of an ordered event stream, in accordance with aspects of the subject disclosure.

FIG. 2 is an illustration of an example scaling of an ordered event stream 200, in accordance with one or more embodiments of the subject disclosure. Ordered event stream 200 can comprise segments. At a first time, for example t1, OES 200 can comprise one or more parallel segments, e.g., segment 1, segment 2, segment 3, etc. At some point a segment can be scaled. As an example, at t2, segment 1 can be scaled up. This can result in causing segment 4 and segment 5 and correspondingly sealing segment 1. The topology of the OES comprising segments 1-3 pre-scaling can be designated as epoch 1. Similarly, the topology of the OES comprising segments 4-5 and 2-3 can be designated as epoch 2.

In an example embodiment, segments 2 and 3 can be continuous across epochs 1 and 2 while segment 1 can end at the transition from epoch 1 to 2. In an example embodiment, in epoch 1, events associated with a key between 0.5 and 1, e.g., $0.5 > key \geq 1$, can be written (and read from) segment 1, while in epoch 2, events associated with a key between 0.75 and 1, e.g., $0.75 > key \geq 1.0$, can be written (and read from) segment 4 and events associated with a key between 0.5 and 0.75, e.g., $0.5 > key \geq 0.75$, can be written (and read from) segment 5. As such, access to events for a given key can be associated with reads in different epochs. As an example, reading an event with a key of 0.8 can read from both segment 1 and segment 4. Where the read is from head to tail, the read of example events with a key of 0.8 can begin reading in segment 4 and then continue reading into segment 1 across the epoch boundary between epoch 2 and 1. Similarly, where the read is from tail to head, events associated with the example key of 0.8 can begin in segment 1 and continue into segment 4 across the epoch boundary.

However, it is noted that generally no additional events are written into segment 1 after the scaling event is committed and a new epoch is begun.

In epoch 2, the topology of OES 200 can comprise segments 4-5 and 2-3. At some point further scaling can be undertaken, e.g., at t3. OES 200 can, for example, scale down by condensing segment 2 and 5 into segment 6 at t3. This example scaling down can reduce a count of segments comprising OES 200. The scaling at t3 can result in ending epoch 2 and beginning epoch 3. The example scaling can cayuse segment 6 and can close segments 2 and 5. As such, in epoch 3, the topology of the OES comprising segments 3-4 and 6 post-scaling can distribute the key space of OES 200, for example, as 0≤segment 3>0.25, 0.25>segment 6≥0.75, and 0.75>segment 4≥1.0.

Scaling can be based on writing of events, such as scaling based on a count of writer instances in a writer group, e.g., one or more writer instances of an application writing to one or more segments of an OES. Where writer instances increase, an OES can be correspondingly scaled up, e.g., increasing a count of segments in an OES, adding additional OESs, etc. Similarly, where a count of writer instances in writer group decreases, an OES can be scaled down, e.g., to reduce a count of segments in an OES, a count of OESs being written to, etc. In some embodiments, scaling can reallocate the key spaced with, or without, changing a count of segments/OESs. As an example, increasing a count of writer instances in a writer group can correspond to more dense events in a segment of an OES, e.g., segment 1. In this example, the OES can be scaled up, e.g., closing segment 1 and opening segments 4 and 5. This can result in the increased event density of segment 1 now being shared by more segments, e.g., segments 4 and 5. Similarly, where event density decreases, such as by having fewer writer instances in a writer group writing events into an OES, the scaled down writer group can trigger scaling down of the OES, e.g., condensing segment 5 and 2 into segment 6 at t3 can be in response to a decrease in writer instances writing events between 0.25 and 0.75 of the vent key space of the illustrated OES. As before, the writer-group-based scaling can be performed, enabled, facilities, etc., by a stream topology component or other components of system 100.

Figure 3:
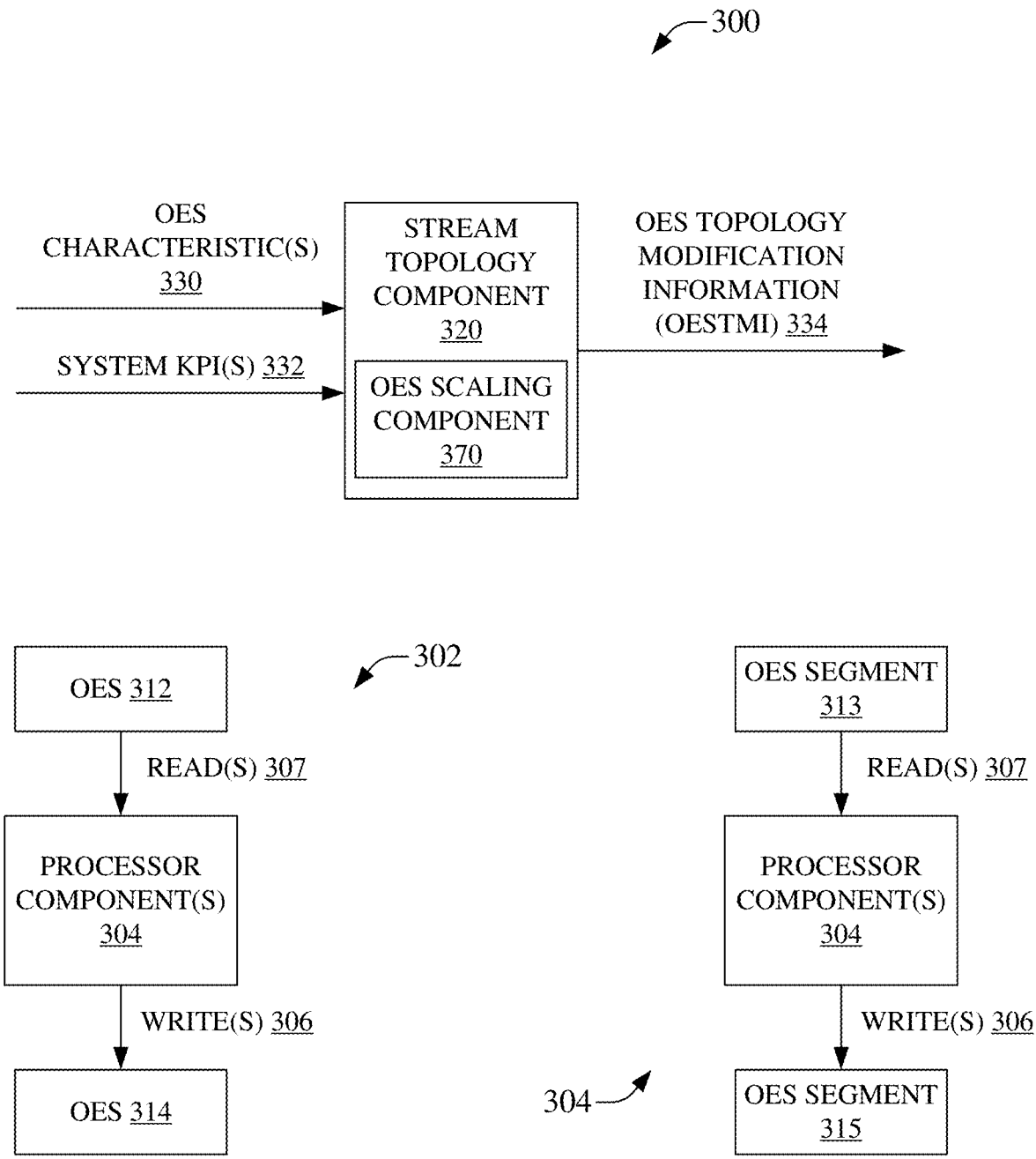
FIG. 3 illustrates an example embodiment that can facilitate scaling of an ordered event stream based on a writer group characteristic, in accordance with aspects of the subject disclosure.

FIG. 3 is an illustration of a system 300, which can facilitate scaling of an ordered event stream based on a writer group characteristic, in accordance with one or more embodiments of the subject disclosure. System 300 can comprise stream topology component 320. Stream topology component 320 can receive information related to characteristics of an event storage system, such as current OES characteristic(s) 330, system KPI(s) 332, etc. Current OES characteristic(s) 330, for example, can comprise a topology of an OES, a current workload of an OES, a current performance of an OES, historical information for the OES such as historical workload(s), historical performance, etc. System KPI(s) 332, for example, can comprise processing instance performance indicators, historical processing instance performance indicators, availability of additional performance instance(s) and/or corresponding performance indicators, etc.

Inputs to stream topology component 320 can be understood to represent, for example, what computing resources are available, how burdened are said computing resources now and/or in the past, what future computing resources can be needed, what future computing resources are available for implementation, etc. This type of information can be employed to determine if the OES topology should be adapted, how it should be adapted, and when it should be adapted. In an embodiment, a stream topology component 320 can be comprised in system 302, 304, etc., and can enable scaling, for example, via OES scaling component 370, one or more of OES 213, 313, 314, 315, etc. Scaling can comprise adding a segment to and OES, removing a segment from an OES, adding an OES, removing an OES, or changing a topology of an OES, for example, altering key space allocation for an OES, which can hereinafter be referred to as 'rekeying' an OES, or other modifications to an OES topology. OES topology modification information (OESTMI) 334 can be generated by stream topology component 320 to facilitate scaling of an OES.

In one or more embodiments a change in a reader group, e.g., a change in a count of reader instances comprising a reader group, etc., can be indicated via one or more of OES characteristic(s) 330, system KPI(s) 332, etc. This information can be employed by stream topology component 320 to cause modification of a count of writer instances comprising one or more writer groups. As an example, in example system 302, events can be read by a reader group, e.g., read(s) 307, from OES 312 and be employed by processor component(s) 304, which can result in new events that can be written by a writer group, e.g., write(s) 306, into OES 314. It is noted that OES 312 can be a same or different OES than OES 314. In an example, OES 312 can be understood to be first segments of an OES and OES 314 can be understood to be second segments of the OES. In another example, OES 312 can be a first OES that is distinct from OES 314. Accordingly, for the sake of clarity and brevity, illustrating a first and second OES is intended to be understood as encompassing distinct OESs, distinct portions of distinct OESs, distinct portions of a same OES, or combinations thereof, unless otherwise implicitly or explicitly indicated otherwise. In accord with this convention, OES segment 313 can be, for example, a first segment(s) of an OES and OES 315 can represent a second segment(s) of the same OES, etc., in example system 304. Systems 302 and 304 can therefore indicate that reading an event and writing another event based on the read event can occur between different OES, such as from an input OES to an output OES, or within a same OES, such as from an input segment of an OES to an output segment of the same OES, etc.

Whereas OES scaling component 370 can provide more than one alternate topology to scale an OES/segment, these alternate topologies can be scored, ranked, etc., based on a criterion, for example spaced consumed, resulting event density(ies), etc., to enable selection of a preferred topology from possible topologies resulting from different scaling permutations. As an example, a first scaling can result in a first event density per segment that can be preferable to a second scaling that can result in a different event density per segment, etc. Accordingly, OES scaling component 370 can employ one or more selection rules in selecting a scaling that can be indicated via OESTMI 334.

In an example, events can be read from OES 312 via a reader group, e.g., as read(s) 307. The example reader group of system 302 can be scaled to have one reader instance per segment of OES 312, such that when the topology of OES 312 increases a count of segments, a count of reader instances of the example reader group can correspondingly increase, and when a count of segments of OES 312 decreases, so to can the count of reader instances in this example. Where a topology of OES 312 can change in time, for example see FIG. 2, the count of reader instances can similarly change over time in this example, e.g., at time t1 of system 200, there can be, for example, three reader instances in the example reader group for segments 1, 2, and 3; then at time t2, the reader group can scale to have four instances for segments 4, 5, 2, and 3; and again at time t3, the reader group can be scaled to comprise three reader instances for segments 4, 6, and 3. The events read by the example scalable reader group can be processed by processor component(s) 304 of system 302 and can be written by a writer group comprising writer instance(s), e.g., as write(s) 306, for example, to OES 314. In embodiments, the writer group can be scaled based on the scaling of the reader group. As an example, the writer group can comprise one writer instance per reader instance of the example reader group. In the above example, where the example reader group is scaled from three instances to four instances, then back to three instances, then the writer group can mirror this scaling to also have three writer instances, then four, then back to three. The writing into OES 314 via the example writer group, e.g., as write(s) 306, can then be employed by OES scaling component 370, to indicate via OESTMI 334, that OES 314 can be scaled in accord with write(s) 306, e.g., OES 314 can be scaled up, then back down in this example. This can illustrate that changing event ingestion for a reader group reading from an input OES, e.g., 312, can cause scaling to cascade through to a writer group that can cascade to an output OES, e.g., 314.

The above example can illustrate that embodiments of the disclosed subject matter can couple scaling across or between OESs based on a writer group characteristic(s), e.g., changes to writer group, such as a change in a count of writer instances, that can affect event density for an output OES/segment, can cause scaling of the output OES/segment, e.g., OES 314, OES segments 315, etc. Further illustrated in FIG. 3, the writer group characteristic(s) can be altered in response to changes in event ingestion, changes in a reader group characteristic, etc. This can enable embodiments of the disclosed subject matter to cascade changes in event ingestion, for example resulting from reading a first OES across an epoch boundary, into a writer group, and correspondingly to an output OES.

It can be readily appreciated that where OES 312 can comprise more than one epoch, which can be associated with a change in event ingestion when reading across the epoch boundary of OES 312, this change in event ingestion, in a conventional system, can be decoupled from changes to an output OES. However, the disclosed technology facilitates coupling changes in ingestion for a reader group to changes to output OESs by a writer group, e.g., a topology of an input OES can cascade to an output OES via the disclosed subject matter. In some embodiments, a writer group can register against an input OES as a reader group and simultaneously be registered against an output OES as a writer group. As such, any reader group and writer group can be regarded as a reader-and-writer group in the disclosed subject matter, although for clarity and brevity such combined groups are still illustrated as separate reader groups and writer groups.

Figure 4:
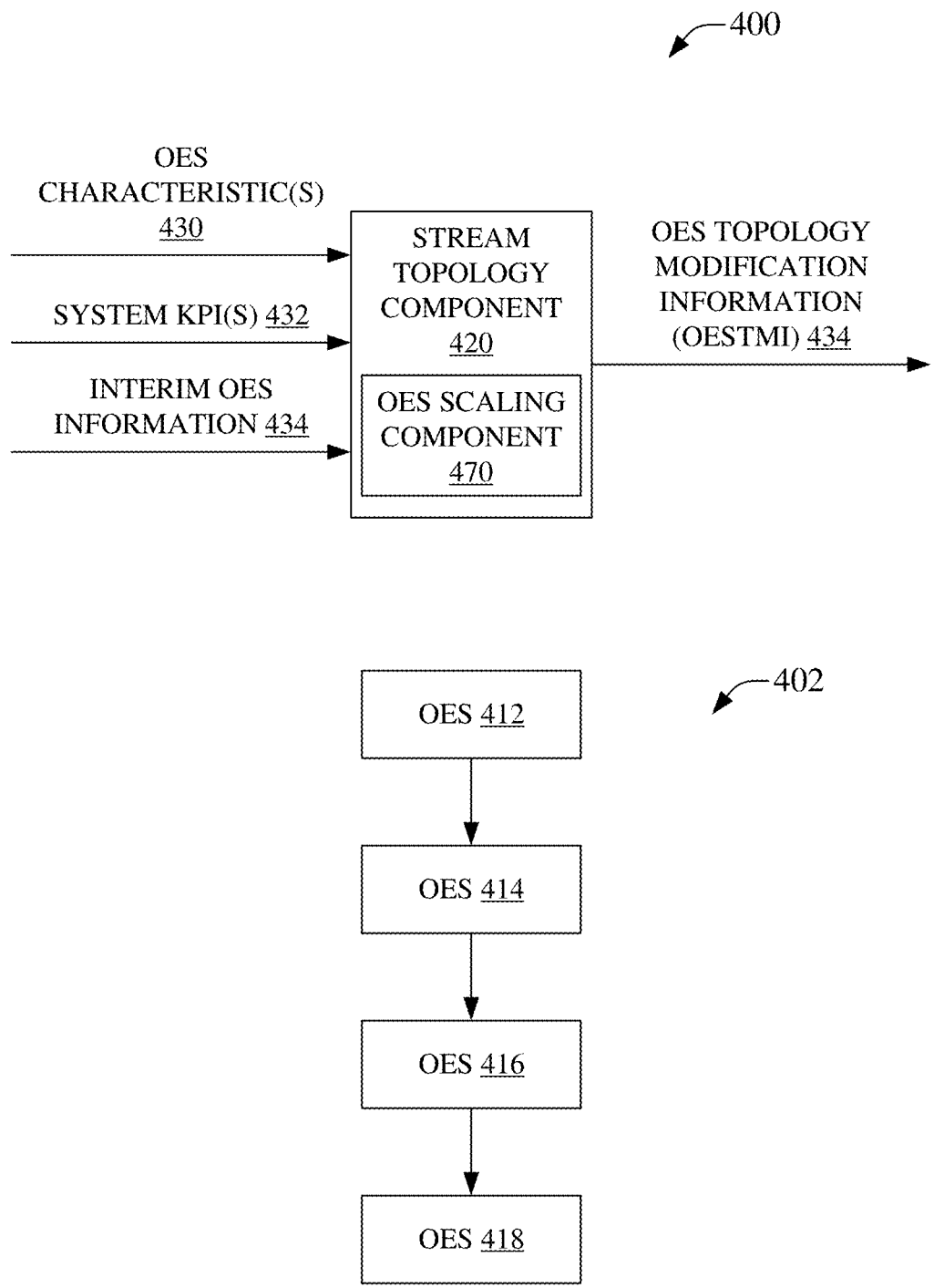
FIG. 4 is an illustration of an example embodiment that can enable cascading scaling of an ordered event stream, in accordance with one or more embodiments of the subject disclosure.

FIG. 4 is an illustration of a system 400 that can enable cascading scaling of an ordered event stream, in accordance with one or more embodiments of the subject disclosure. System 400 can comprise stream topology component 420. Stream topology component 420 can receive information related to characteristics of an event storage system, such as current OES characteristic(s) 430, system KPI(s) 432, interim OES information 434, etc. Current OES characteristic(s) 430, for example, can comprise a topology of an OES, a current workload of an OES, a current performance of an OES, historical information for the OES such as historical workload(s), historical performance, etc. System KPI(s) 432, for example, can comprise processing instance performance indicators, historical processing instance performance indicators, availability of additional performance instance(s) and/or corresponding performance indicators, etc. Interim OES information 434, for example, can comprise OES/segment information corresponding to one or more of OES 412, 414, 416, 418, etc. As such, current OES characteristic(s) 430, system KPI(s) 432, interim OES information 434, etc., can reflect OES/segment conditions, performance, location, historical data, etc., for one or more portions of one or more of OES 412, 414, 416, 418, etc. OES scaling, via OES scaling component 470, can therefore be applied to one or more of OES 412, 414, 416, 418, etc. As such, system 400 can facilitate cascading OES scaling, e.g., via scaling information comprised in OESTMI 434, etc.

In an example, events can be read from OES 412 via a reader group, which events can be processed in some manner, and an interim result from the processing can be written, e.g., via a writer group, to OES 414, which can be an interim OES. Subsequently, though typically immediately or contemporaneously, the interim results can be read from OES 414 and can be used to generate second interim results written to OES 416. Second interim results read from OES 416 can then be used to generate output result events at OES 418. This example can then be understood to generate output results at OES 418 from input events read from OES 412, via interim events written at OES 414 and second interim events written at OES 416. It is noted that there can be more or fewer interim tiers.

In conventional OES systems, the typical separation of reading groups and writing groups can result in increased managerial complexity between events being read and related events being written. In the above example, a conventional system could be expected to have separate function calls to scale each of OES 414, 416, and 418, based on consumption of computing resources resulting from reading and processing events from OES 412. Moreover, where scaling is not based on a writer group characteristic(s), then the conventional processing of read events from the above example can result in event densities at OES 418 that can cause scaling of OES 418 when events are read therefrom. As is noted hereinabove, it can be more computing resource efficient to scale at the time of writing than performing the writing and then later, at the time of reading events, scaling the OES. As such, the disclosed subject matter supporting cascading of scaling in system 402 can be beneficial.

In system 402, OES 418 can be scaled based on a characteristic(s) of a writer group that can be writing events to OES 418, e.g., a threshold value can be compared to a characteristic(s) of the writer group and the comparison can be employed to cause scaling of OES 418. In turn, the characteristic of a writer group writing into OES 418 can result from reading events from OES 416. Reading events from 416 can be based on the topology of OES 416 that, in turn, can be scaled based on a characteristic(s) of a writer group writing into OES 416 from events read from OES 414. This can be traced back through similar iterations back to events being read from OES 412, which ingestion rate can change as a result of the topology of OES 412, e.g., scaling of OES 412 over time can alter the topology of OES 412 into different epochs such that reading events across epochs of OES 412 can cause scaling to cascade, in this example, all the way down to OES 418. It is noted that where system 402 does not comprise interim OESs, then system 402 can be the same as, or similar to, systems 302/304. Similarly, adding interim stages to system 302/304, can result in a system that can be the same as, or similar to, system 402.

A cascading system, e.g., system 302, 304, 402, etc., can reduce a need for an application developer to find correct auto-scaling parameters for each and every stream/segment, including the intermediate streams/segments, that an application will interact with, which can be an exceedingly tedious task, more especially when there can be a plurality of streams/segments for an application reading events from a starting stream and outputting resulting events into a destination stream, e.g., the more complex the interim stream structure for an application being developed, the greater the complexity put to a developer not employing the disclosed cascading OES scaling. Further, the disclosed cascading is asynchronous and can operate independently for different streams/segments, e.g., the writer group characteristics can be used to scale an interim/output OES or portion thereof, which can happen sequentially via cascading. This can be contrasted with synchronous scaling in which all interim and output OESs are scaled, which can be significantly more complex due to needing to proactively forecast scaling to downstream OESs, rather than reactively scaling downstream OESs when the writer group writing into them transitions a corresponding threshold value, satisfies a corresponding rule, etc. Asynchronous scaling can therefore be less likely to fail that the more complicated synchronous scaling found in more conventional systems. Cascading scaling based on writer group characteristic(s) can support efficient propagation of scaling.

Figure 5:
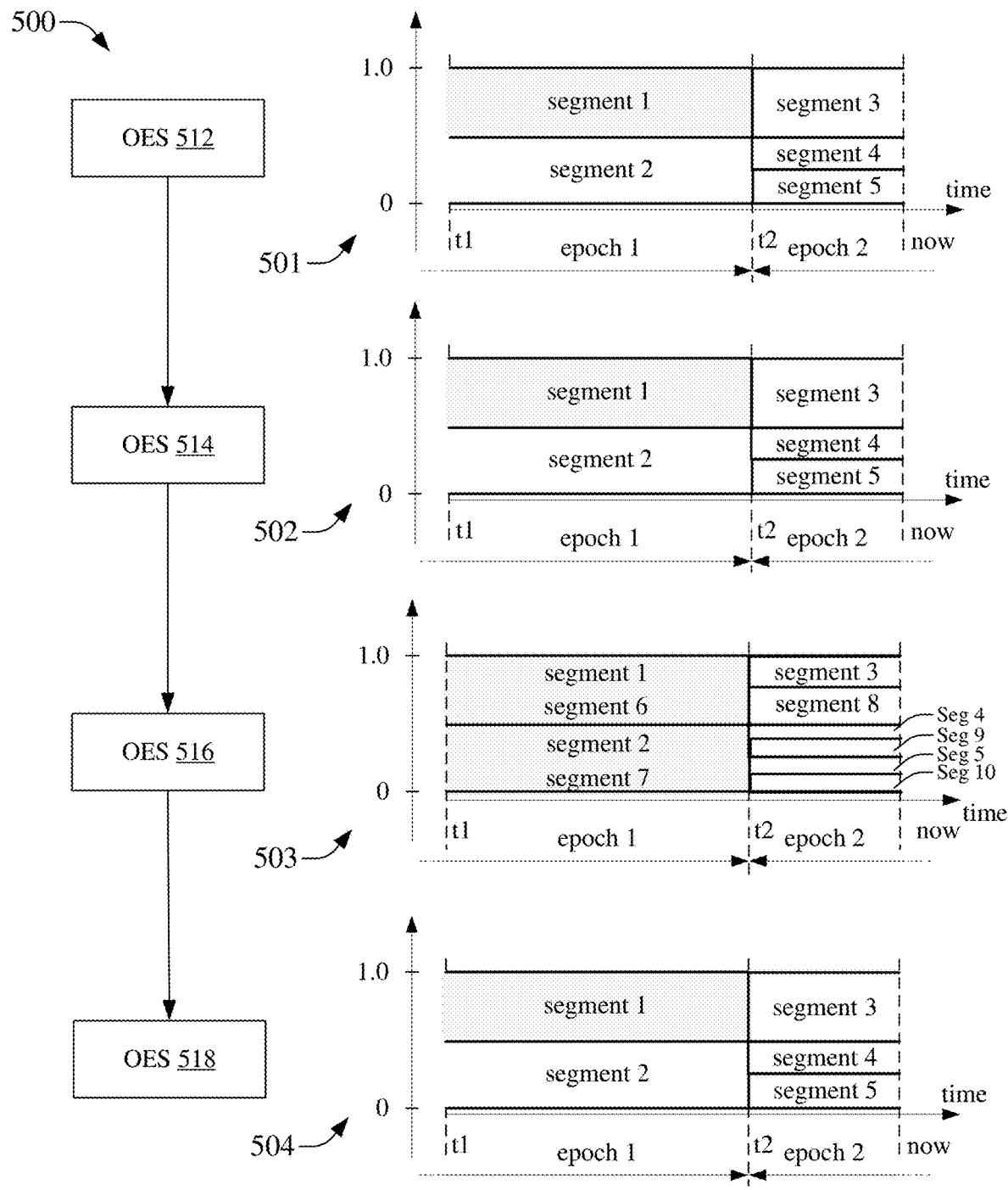
FIG. 5 is an illustration of an example embodiment facilitating ratioed scaling of an ordered event stream, in accordance with one or more embodiments of the subject disclosure.

FIG. 5 is an illustration of a system 500 that can facilitate ratioed scaling of an ordered event stream based, in accordance with one or more embodiments of the subject disclosure. System 500 can comprise OESs 512 to 518. In an embodiment of the disclose subject matter, OES 512 can be regarded as an input OES, and OES 518 can be regarded as an output OES, such that events read from OES 512 result in event(s) written to OES 518. As illustrated, OES 514 and 516 can be interim OESs, e.g., then processing of read events from OES 512 can occur in stages, wherein the results of each stage can be written to an interim OES. As an example, an event read from OES 512 can be factored and the resulting factors can be written to OES 514, then the factors written to OES 514 can be filtered according to some criterion and the results can be written to OES 516. The events from 516, in this example, can then be read and used to compute a box-car average that can be recoded as output at OES 518.

System 500 can, as an example, demonstrate ratioed cascading scaling. In an embodiment, the various interim processes performed in going from events of OES 512 to events of OES 518 can cause a change in the interim event density, e.g., in the events of OES 514, OES 516, etc., and in the output OES event density, e.g., at OES 518. In this regard, an amount of data, computing, etc., can vary for different phases of an application, and therefore, scaling of different streams/segments can be different at each phase, e.g., not all phases may scale in the same way. In an embodiment, a scaling can be determined for a stream based on a characteristic(s) of a writer group writing into that stream/segment. An example can be a ratio, such as, creating a stream segment for each writer in a writer group, creating a stream segment for a pair of writers in a writer group, creating two stream segments for each writer in a writer group, etc. As such, the interim events at OES 514 from reading events of OES 512 can be at a first ratio, those written into OES 516, can be at a second ratio of the events read from OES 514, those written into OES 518 can be at a third ration of those read from OES 516, etc.

As an example, a 1:1 ratio for writer instances writing into OES 514 can be employed. Accordingly, where an example writer group comprises one writer instance for reach reader instance of a reader group reading from OES 512, then the scaling, in this example, between OES 512 and OES 514 can be 1:1. This can be seen in the topology of OES 512 as illustrated at 501 being the same topology as OES 514 as illustrated at 502, e.g., 502 is a 1:1 scaling of 501. This can indicate that for each event read from OES 512, a corresponding event is written to the same key value at OES 514. It is noted that the time between reading an event from 512 and writing to 514 is typically exceedingly brief in comparison to the scale of time illustrated horizontally in 501 to 504 and, as such, the miniscule time difference between reading an event in 501 and wring the event in 502, e.g., the cascading time, is typically not easy to illustrate. As such, it is noted that there can be some delta time value added to cascading the writing of events to a lower OES, however, this time is not believed to be particularly significant to the current disclosure and is therefore raised and dismissed for the sake of completeness of the disclosure.

Continuing the above example, the cascade from OES 514 to OES 516 can result in a 2:1 ratio. This is illustrated by OES 516 comprising two segments in 503 for each segment of 502. In this regard, the events written from the interim processing of events from OES 514 into OES 516 can be at twice the event density as OES 514. Whereas the illustrated doubling of the density can correspond to doubling the demand to read events from OES 516, OES 516 can respond to the increased writer group event density by scaling OES 516 in a 2:1 ratio that can result in doubling the segments that can be accorded an individual reader. This can allow reading events from OES 516 to occur faster to compensate for the increased event density of events being written into OES 516 based on events read from OES 514.

Similarly, as an extension of the above example, the cascade from OES 516 to OES 518 can result in a 1:2 ratio, e.g., events read from OES 516 by a count of reader applications can result in writing events to OES 518 at a rate that can be performed by fewer writer instances, e.g., half the writer instances as reader instances yielding a 1:2 ratio. This can be considered a contracting scaling. Whereas the writer can write at a lower event density, OES 518 can be scaled based on the writes coming from the writer group between OES 518 and OES 516. This can result, as illustrated, in OES 518 having a topology as illustrated at 504, e.g., one segment for every two segments of OES 516.

System 500, in the above example, can therefore write events to OES 518 at the same density as that read from OES 512. However, system 500, as illustrated in the above example, can generate interim events at both higher and lower event densities. Where the writing of events in to an OES can be scaled based on a characteristic(s) of a corresponding writer group, the scaling of interim and output OESs can be cascade scaled, such as based on corresponding ratios or other determined value(s). This can enable substantially less complex management for an application developer in comparison to individually managing the scaling of each OES encountered by an application. As an example, a developer can call a 'ReaderWriterGroup' call from an application programming interface (API), which can take in an input and output OES and can internally manage interim OESs, rather than forcing the developer to call individual 'ReaderGroup' and 'WriterGroup' calls for each interim and output layer, then manage scaling between each of these OES in the developed application, which can readily be appreciated as being far more complex and difficult to perform correctly.

Figure 6:
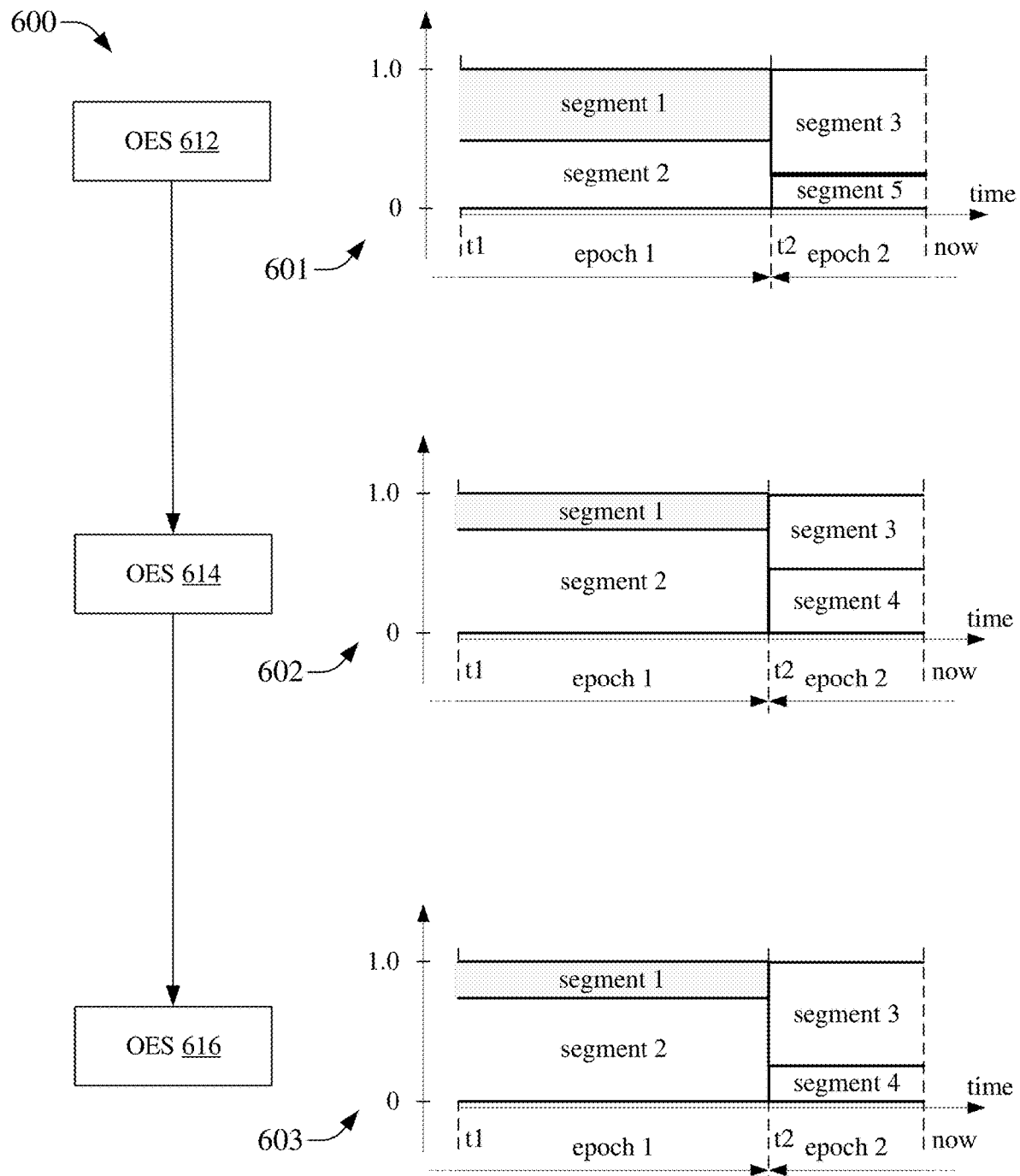
FIG. 6 is an illustration of an example embodiment enabling rekeying of an ordered event stream, in accordance with one or more embodiments of the subject disclosure.

FIG. 6 is an illustration of a system 600 that can enable rekeying of an ordered event stream, in accordance with one or more embodiments of the subject disclosure. System 600 can comprise OESs 612 to 616. In an embodiment of the disclose subject matter, OES 612 can be regarded as an input OES, and OES 616 can be regarded as an output OES, such that events read from OES 612 result in event(s) written to OES 616. As illustrated, OES 614 can be interim OESs, e.g., then processing of read events from OES 612 can occur in stages, wherein the results of each stage can be written to an interim OES. As an example, an event read from OES 612 can be used to determine a value that can be recoded as output at OES 616.

System 600 can, as an example, demonstrate rekeying via cascading scaling. In an embodiment, the various interim processes performed in going from events of OES 612 to events of OES 616 can cause a change in an interim event density, e.g., in the events of OES 614, etc., and in the output OES event density, e.g., at OES 616. In this regard, an amount of data, computing, etc., can vary for different phases of an application, and therefore, scaling of different streams/segments can be different at each phase, e.g., not all phases may scale in the same way. In an embodiment, a scaling can be determined for a stream based on a characteristic of a writer group writing into that stream/segment. As is noted elsewhere herein, scaling can include rekeying, e.g., reallocating key ranges among a number of OESs of segments of an OES, etc. As an example, a 50:50 spit of a key space between two segments can be rekeyed to a 25:75 split of the key space amount the two segments. As such, the interim events at OES 614 from reading events of OES 612 can be result in rekeying of OES 614, and events read from OES 614 can result in rekeying OES 616, etc.

As an example, reading events from OES 612 across an epoch boundary can result in a change in the density of interim events being written into OES 614. Accordingly, the keying segments for OES 614 can be altered. At t1 of 601, the events being read from OES 612 can change to a 50:50 split between segment 1 and segment 2. This can result in writing more densely into key ranges corresponding to segment 1 of OES 614 at 602. In this example, at t2, the events read from OES 612 can change, which can result in writing events with a different density into OES 614, whereby a stream topology component, e.g., 420, etc., can rekey OES 614 to reflect the change in event density across the key range. At 602, near t2, the range of events for segment 1 can be become less dense and segment 2 can become increasingly dense, which change can be compensated for by rekeying to shift from the topology in epoch 1 to the topology in epoch 2, which can shift some of the event density from segment 2 into segment 3.

Continuing the example, processing of events read from OES 614 can be reflected in changes in OES 616 based on the writing of events thereto, e.g., based on characteristic(s) of a writer group writing into OES 616, such as according to topology 603. As such, the transition at t2 in 601 can result in a density change according to topology 602 that can cascade to the density of results written according to topology 603. At t2, the density of events written into OES 616 can increase for segment 2 and decrease for segment 1 of topology 603. This can result in rekeying into epoch 2 of topology 603. It is noted that rekeying does not depend on a change in count of segments between two epochs. However, it is further noted that rekeying can be combined with adding or removing segments/OESs, e.g., scaling can comprise changing a count of segments/OESs, for example as shown in FIG. 5, rekeying, for example as shown in FIG. 6, or combinations thereof.

Figure 7:
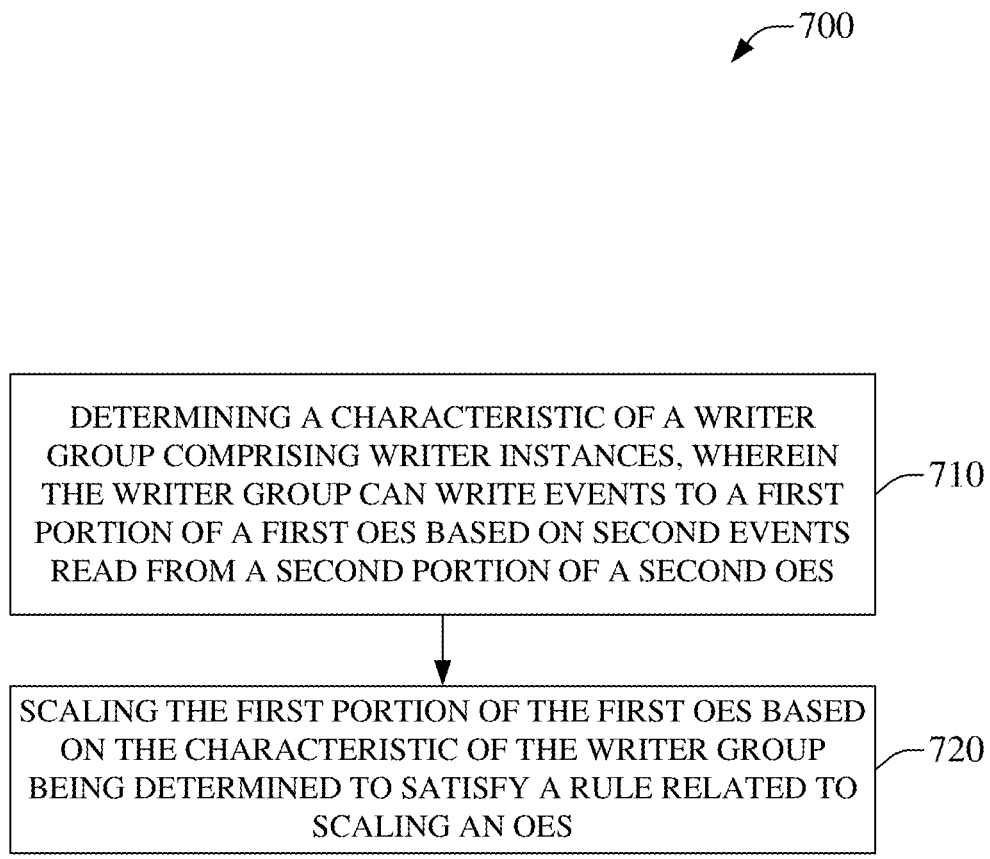
FIG. 7 is an illustration of an example method facilitating scaling of an ordered event stream based on a writer group characteristic, in accordance with one or more embodiments of the subject disclosure.
Figure 8:
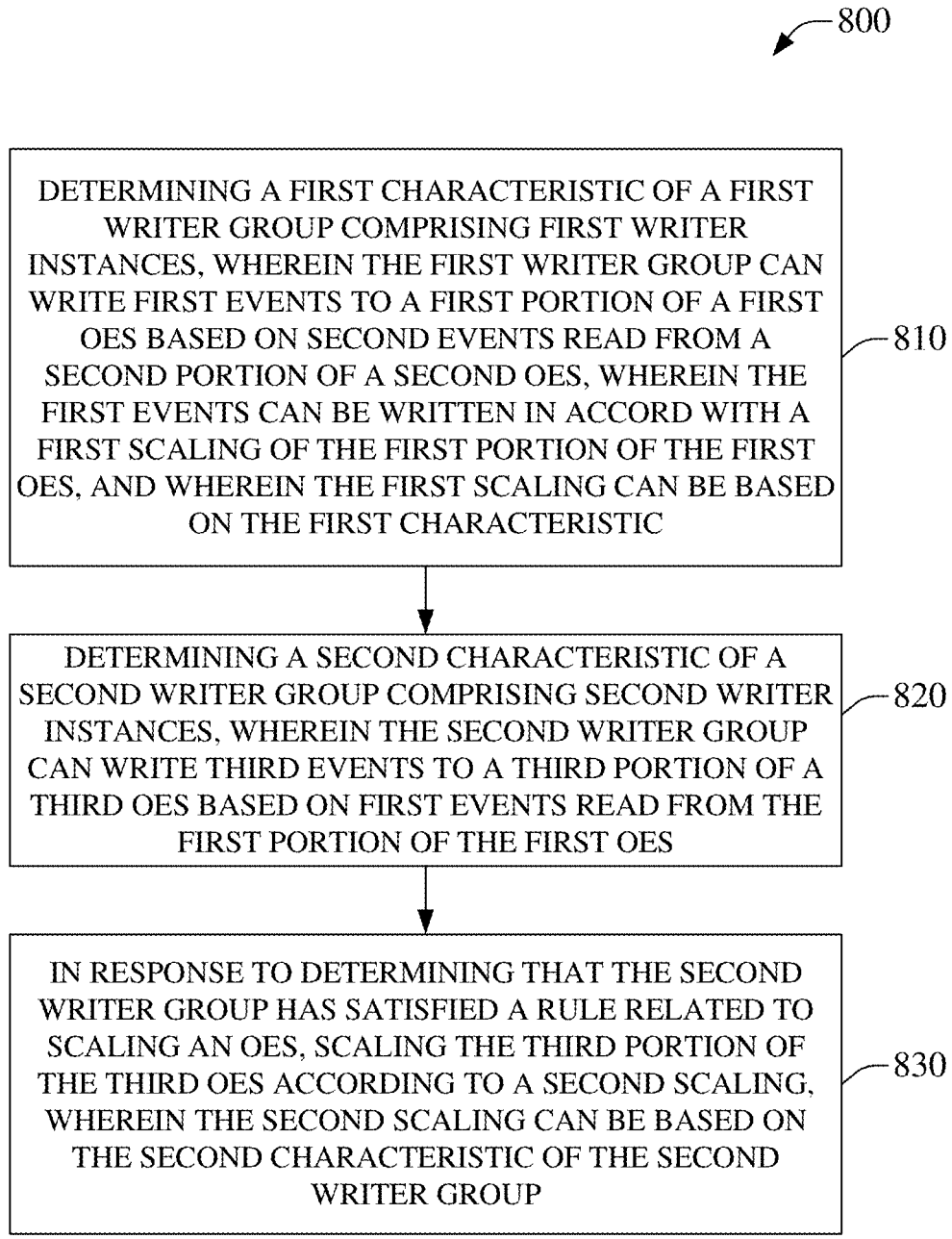
FIG. 8 is an illustration of an example method facilitating scaling of an ordered event stream based on a cascading writer group characteristic, in accordance with one or more embodiments of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more processes, operations, acts, etc. herein described. It should be further appreciated that the example methods disclosed throughout the subject specification are capable of being stored on an article of manufacture (e.g., a non-transitory computer-readable medium) to allow transporting and transferring such methods to computers for execution, and thus implementation, by a processor or for storage in a memory.

FIG. 7 is an illustration of an example method 700, which can facilitate facilitating scaling of an ordered event stream based on a writer group characteristic, in accordance with one or more embodiments of the subject disclosure. Method 700 can comprise determining a characteristic(s) of a writer group comprising writer instance(s). The determined characteristic can indicate performance of a writer group or changes thereto, for example, a count of, or changes to a count of, writer instances of the writer group, changes in rate/speed of event writing, changes in a density of events being written to a portion of an OES, etc. In embodiments, a reader instance of a reader group can read second events form a second portion of an OES. The events can be employed in determining data that can be written as first events to a first portion of the OES, to another OES, etc. The characteristics of the writer group can therefore be influenced by the ingestion of second events, processing of those second events, writing of the first events, etc. As is noted elsewhere herein, the writing of the first events can be adapted by changing a count of writer instances in the writer group. In embodiments, this can enable more efficient use of computing resources when writing the first events, scaling of the first portion of the OES to achieve improved event density distribution, e.g., scaling the OES contemporaneous with the writing of events can result in segments that can be more efficiently read at a later time while reducing a likelihood of needing to scale the OES at reading, etc.

Method 700, at 720, can comprise scaling the first portion of the first OES based on the characteristic of the writer group being determined to satisfy a rule related to scaling an OES or portion thereof. At this point method 700 can end. Where a writer group characteristic is determined, the characteristic can be used to trigger scaling of the portion of the OES the writer group is writing to. In an example, where the writer group characteristic indicates that the count of writer instances has doubled, this can satisfy the rule and can trigger scaling of the OES, for example to rekey the OES, add/remove segment(s) to/from the OES, etc. In embodiments, the rule can indicate scaling characteristics in addition to triggering a scaling event, e.g., the characteristic of the writer group can, in some embodiments, trigger scaling of the OES and can also indicate a level of scaling related to the characteristic, for example, indicating a scaling ratio, scaling via rekeying, etc.

FIG. 8 is an illustration of an example method 800, which can enable scaling of an ordered event stream based on a cascading writer group characteristic, in accordance with one or more embodiments of the subject disclosure. At 810, method 800 can comprise determining a first characteristic(s) of a first writer group comprising first writer instance(s). The determined first characteristic can indicate performance of the first writer group or changes thereto. In embodiments, the first writer group can write first events to a first portion of a first OES based on second events read from a second portion of a second OES. The first events can be written in accord with a first scaling of the first portion of the first OES and the first scaling can be based on the first characteristic of a reader instance of a reader group that can read second events form a second portion of an OES. The characteristics of the first writer group can therefore be influenced by the ingestion of second events, processing of those second events, writing of the first events, etc. As above, the writing of the first events can be adapted by changing a count of writer instances in the writer group. In embodiments, this can enable more efficient use of computing resources when writing the first events, scaling of the first portion of the OES to achieve improved event density distribution, e.g., scaling the OES contemporaneous with the writing of events can result in segments that can be more efficiently read at a later time while reducing a likelihood of needing to scale the OES at reading, etc. Moreover, the first portion of the first OES can be employed to store interim events, e.g., the first events can be stored in an OES to support further operations that can generate other events.

At 820, method 800 can comprise determining a second characteristic of a second writer group comprising second writer instances, wherein the second writer group writes third events to a third portion of a third OES based on first events read from the first portion of the first OES. In an embodiment, the second writer group can receive events written by the first writer group at 810, e.g., the first events can be interim events that can be employed for further operations resulting in the second writer group being permitted to write third events at another portion of an OES, at another OES, etc., e.g., at the third portion of the third OES. It is noted that, as above, the first, second, and here third OES can be the same or different OESs. As an example, events can be read from the second OES to cause writing to a first OES that can cause writing to a third OES. As another example, events can be read from a second portion of an OES to cause writing to a first portion of the OES that can cause writing to a third portion of the same OES. As an additional example, events can be read from the second OES to cause writing to a first portion of an OES that can cause writing to a third portion of the same OES as the first portion but that can be a different OES than the second portion/OES. Other permutations are readily appreciated and are all within the scope of the present disclosure despite not being more exhaustively recited for the sake of clarity and brevity.

Method 800, at 830, can comprise scaling the third portion of the third OES according to a second scaling, in response to determining that the second writer group has satisfied a rule related to scaling an OES. The second scaling can be based on the second characteristic of the second writer group. At this point method 800 can end. As such a writer group characteristic, e.g., for the second scaling can be used to trigger scaling of the portion of the OES the second writer group is writing to. Moreover, this second scaling can cascade from the first scaling, e.g., the first scaling can alter an interim portion of an OES, which can alter reading events from the interim portion, and the altered reading of the interim events can affect the writing of the third events in a manner that can result in a second scaling of the output portion of the OES, e.g., reading from OES A impacts writing into OES B, which impact cascades into reading from OES B and writing into OES C such that the characteristics of a writing group writing into OES C can trigger scaling of OES C. In this example, the characteristics of a writing group writing into OES B can also trigger scaling of OES B.

Figure 9:
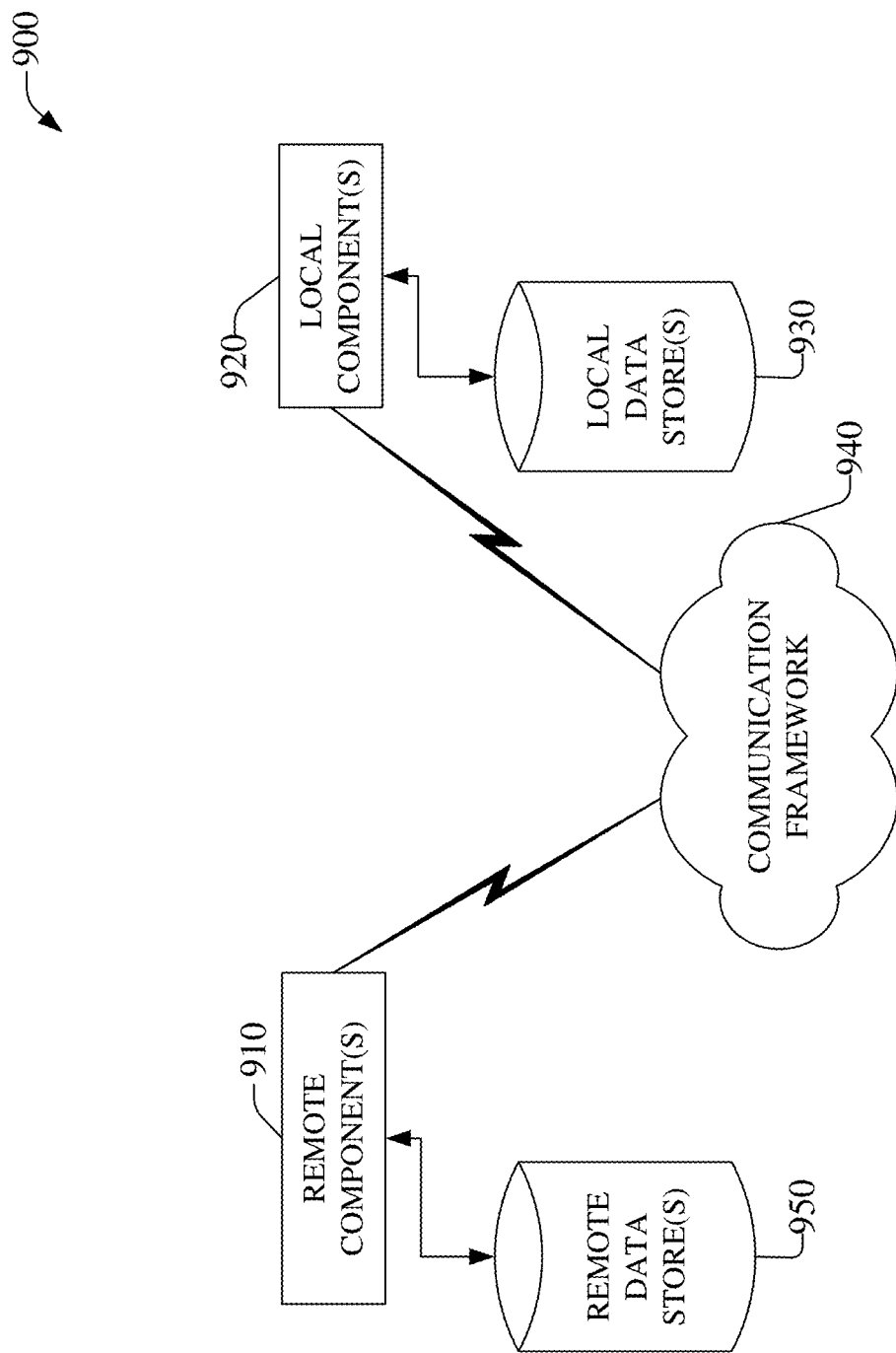
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, a remotely located processor device comprised in processor component 104, a remotely located device comprised in stream topology component 120, 320, 420, etc., connected to a local component via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102, a processor device comprised in processor component 104, a device comprised in stream topology component 120, 320, 420, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, OESCs 330, 430, etc., system KPIs 332, 432, etc., write(s) 106, read(s) 107, OES topology modification information 334, 434, etc., interim OES information 434, etc., writer group characteristic(s), etc., can be communicated via communication framework 940 among components of an OES storage system 100, 200, 300, 400, 500, 600, etc., e.g., to facilitate adapting, altering, modifying, scaling, rekeying, etc., a topology of an OES, or portion thereof, as disclosed herein.

Figure 10:
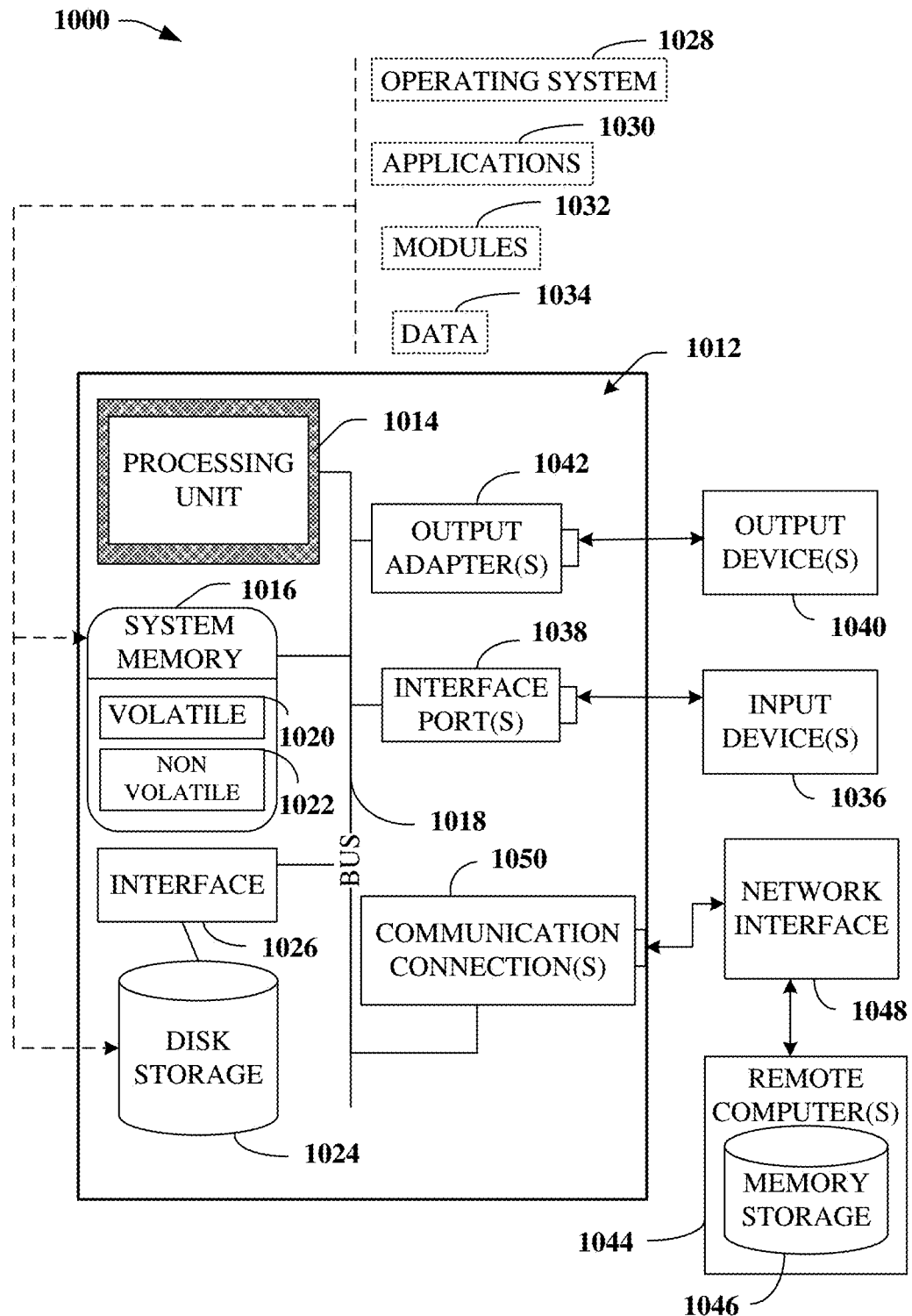
FIG. 10 illustrates an example block diagram of a computing system operable to execute the disclosed systems and methods in accordance with an embodiment.

In order to provide a context for the various embodiments of the disclosed subject matter, FIG. 10, and the following discussion, are intended to provide a brief, general description of a suitable environment in which the various embodiments of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated embodiments can also be practiced in distributed computing environments where tasks are performed by remote processing devices that are linked through a communications network; however, some if not all embodiments of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102, processor component 104, stream topology component 120, 320, 420, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an example embodiment, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising analyzing an ordered event stream storage system. The OES can comprise a first portion, a second portion, and third portion, wherein a reader instance can read a first event from the first portion. The first event can then be employed by a first writer group to write a second event to the second portion. The second event can then be employed in determining data for a third event. A second writer group can facilitate writing the third event into the third portion. Based on the analyzing the ordered event stream storage system, a first characteristic of the first writer group and a second characteristic of the second writer group can be determined. Scaling the third portion of the ordered event stream storage system can be based on the second characteristic of the second writer group. The scaling can be contemporaneous with the writing the third event into the third portion of the ordered event stream storage system.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving an indication of a characteristic of a writer group, wherein a reader instance reads a first event from a first portion of a first ordered event stream of an ordered event stream storage system, wherein the first event is employed in determining data for a second event, and wherein the writer group facilitates writing the second event into a second portion of a second ordered event stream of the ordered event stream storage system; and
scaling the second portion of the second ordered event stream based on the indication of the characteristic of the writer group.

2. The system of claim 1, wherein the characteristic of the writer group changes in response to changes in the first portion of the first ordered event stream.

3. The system of claim 1, wherein the scaling is triggered by the indication of the characteristic transitioning a threshold value.

4. The system of claim 1, wherein the scaling is ratioed scaling.

5. The system of claim 1, wherein the scaling causes rekeying of the second portion of the second ordered event stream.

6. The system of claim 1, wherein the scaling causes altering of a number of segments of the second portion of the second ordered event stream and rekeying of the second portion of the second ordered event stream.

7. The system of claim 1, wherein the first ordered event stream and the second ordered event stream are a same ordered event stream.

8. The system of claim 1, wherein the first ordered event stream and the second ordered event stream are different ordered event streams.

9. The system of claim 1, wherein the operations further comprise supporting an application programming interface that enables calling a function that registers an application instance as the writer group with respect to the second portion of the second ordered event stream and concurrently registers the application instance as a reader group comprising the reader instance with respect to the first portion of the first ordered event stream.

10. The system of claim 1, wherein the scaling the second portion occurs contemporaneous with the writing the second event into the second portion of the second ordered event stream.

11. The system of claim 1, wherein:
the indication is a first indication,
the characteristic is a first characteristic,
the writer group is a first writer group,
the reader instance is a first reader instance,
the data is first data, and
wherein the operations further comprise:
receiving a second indication of a second characteristic of a second writer group, wherein a second reader instance reads the second event from the second portion of the second ordered event stream, wherein the second event is employed in determining second data for a third event, and wherein the second writer group facilitates writing the third event into a third portion of a third ordered event stream of the ordered event stream storage system; and scaling the third portion of the third ordered event stream based on the second indication of the second characteristic of the second writer group.

12. The system of claim 11, wherein the scaling the second portion results in topographical changes that are further applicable to the scaling the third portion of the third ordered event stream.

13. The system of claim 11, wherein the operations further comprise supporting an application programming interface that enables calling a function that registers an application instance as the writer group associated with the third portion of the third ordered event stream, simultaneously registers the application instance as the reader group associated with the first portion of the first ordered event stream, and assigns management of the scaling of the second portion of the second ordered event stream to the application instance.

14. A method, comprising:
determining, by a system comprising a processor, a first characteristic of a first writer group, wherein a reader instance reads a first event from a first portion of a first ordered event stream of an ordered event stream storage system, wherein the first event is employed in writing a second event to an interim portion of an interim ordered event stream, wherein the interim event is employed in determining data for an output event, and wherein the first writer group facilitates writing the output event into a second portion of a second ordered event stream of the ordered event stream storage system; and
scaling, by the system, the second portion of the second ordered event stream based on an indication of the characteristic of the writer group, wherein the scaling is contemporaneous with the writing the output event into the second portion of the second ordered event stream.

15. The method of claim 14, wherein the first characteristic of the first writer group is influenced by a scaling of the interim portion of the interim OES, wherein the scaling of the interim portion is based on a second characteristic of a second writer group, and wherein the second writer group facilitates the writing of the interim event into the interim portion of the interim ordered event stream.

16. The method of claim 14, further comprising supporting, by the system, instantiation of a function via an application programming interface, wherein the instantiating the function registers an application instance as the first writer group against the second portion of the second ordered event stream, and contemporaneously registers the application instance as a reader group comprising the reader instance against the first portion of the first ordered event stream.

17. The method of claim 16, wherein the instantiating the function enables the application instance to manage scaling of the interim portion of the interim ordered event stream.

18. A non-transitory machine-readable medium, comprising executable instructions that, when executed by a processor, facilitate performance of operations, comprising:
analyzing an ordered event stream storage system comprising a first portion, a second portion, and third portion, wherein a reader instance reads a first event from the first portion, wherein the first event is employed by a first writer group to write a second event to the second portion, wherein the second event is employed in determining data for a third event, and wherein a second writer group facilitates writing the third event into the third portion;
based on the analyzing the ordered event stream storage system, determining a first characteristic of the first writer group and determining a second characteristic of the second writer group; and
scaling the third portion of the ordered event stream storage system based on the second characteristic of the second writer group, wherein the scaling is contemporaneous with the writing the third event into the third portion of the ordered event stream storage system.

19. The non-transitory machine-readable medium of claim 18, wherein the first characteristic of the first writer group results in scaling the second portion, and wherein the scaling the second portion affects the second wrier group in a manner that cascades into the determining the second characteristic of the second writer group, resulting in the scaling of the third portion being influenced by the scaling of the second portion of the ordered event stream storage system.

20. The non-transitory machine-readable medium of claim 18, wherein the first portion is comprised in a first ordered event stream that is a different ordered event stream than a second ordered event stream comprising the second portion, and wherein the third portion is comprised in a third ordered event stream that is a different ordered event stream than the first ordered event stream and the second ordered event stream.

* * * * *